(12) United States Patent
Ayres et al.

(10) Patent No.: US 10,649,216 B2
(45) Date of Patent: May 12, 2020

(54) LIGHT HOMOGENIZATION

(71) Applicant: AKONIA HOLOGRAPHICS LLC, Longmont, CO (US)

(72) Inventors: Mark R. Ayres, Boulder, CO (US); Adam Urness, Louisville, CO (US); Kenneth E. Anderson, Boulder, CO (US); Friso Schlottau, Lyons, CO (US)

(73) Assignee: Akonia Holographics LLC, Longmont, CO (US)

( * ) Notice: Subject to any disclaimer, the term of this patent is extended or adjusted under 35 U.S.C. 154(b) by 0 days.

(21) Appl. No.: 16/401,574

(22) Filed: May 2, 2019

(65) Prior Publication Data

US 2019/0258064 A1    Aug. 22, 2019

Related U.S. Application Data

(63) Continuation of application No. 15/479,252, filed on Apr. 4, 2017, now Pat. No. 10,317,679.

(60) Provisional application No. 62/318,039, filed on Apr. 4, 2016, provisional application No. 62/318,917, filed on Apr. 6, 2016, provisional application No. 62/412,728, filed on Oct. 25, 2016.

(51) Int. Cl.
| | |
|---|---|
| *G02B 27/01* | (2006.01) |
| *F21V 8/00* | (2006.01) |
| *G02B 27/14* | (2006.01) |
| *G03H 1/02* | (2006.01) |
| *G03H 1/04* | (2006.01) |
| *G02B 5/18* | (2006.01) |
| *G02B 5/32* | (2006.01) |

(52) U.S. Cl.
CPC .......... *G02B 27/0172* (2013.01); *G02B 5/18* (2013.01); *G02B 6/0016* (2013.01); *G02B 6/0031* (2013.01); *G02B 6/0055* (2013.01); *G02B 27/14* (2013.01); *G02B 27/144* (2013.01); *G03H 1/02* (2013.01); *G03H 1/0402* (2013.01); *G02B 5/32* (2013.01); *G02B 2027/0118* (2013.01); *G02B 2027/0147* (2013.01); *G02B 2027/0174* (2013.01); *G02B 2027/0178* (2013.01); *G03H 2001/026* (2013.01); *G03H 2001/0216* (2013.01); *G03H 2001/0441* (2013.01); *G03H 2222/45* (2013.01)

(58) Field of Classification Search
None
See application file for complete search history.

(56) References Cited

U.S. PATENT DOCUMENTS

| | | |
|---|---|---|
| 4,017,158 A | 4/1977 | Booth |
| 6,882,452 B2 | 4/2005 | Decker et al. |
| 7,162,136 B1 | 1/2007 | Pertl et al. |

(Continued)

*Primary Examiner* — Jennifer D. Carruth
(74) *Attorney, Agent, or Firm* — Michael H. Lyons

(57) ABSTRACT

An optical reflective device for homogenizing light including a waveguide having a first and second waveguide surface and a partially reflective element is disclosed. The partially reflective element may be located between the first waveguide surface and the second waveguide surface. The partially reflective element may have a reflective axis parallel to a waveguide surface normal. The partially reflective element may be configured to reflect light incident on the partially reflective element at a first reflectivity for a first set of incidence angles and reflect light incident on the partially reflective element at a second reflectivity for a second set of incident angles.

20 Claims, 10 Drawing Sheets

(56) References Cited

U.S. PATENT DOCUMENTS

| | | |
|---|---|---|
| 7,245,408 B1 | 7/2007 | Huang et al. |
| 7,418,170 B2 | 8/2008 | Mukawa et al. |
| 7,502,168 B2 | 3/2009 | Akutsu et al. |
| 7,764,413 B2 | 7/2010 | Levola |
| 8,160,411 B2 | 4/2012 | Levola et al. |
| 8,233,204 B1 | 7/2012 | Robbins et al. |
| 8,446,675 B1 | 5/2013 | Wang et al. |
| 8,665,178 B1 | 3/2014 | Wang |
| 8,903,207 B1 | 12/2014 | Brown et al. |
| 9,075,184 B2 | 7/2015 | Popovich et al. |
| 9,207,461 B2 | 12/2015 | Frankel et al. |
| 9,341,846 B2 | 5/2016 | Popovich et al. |
| 9,349,165 B2 | 5/2016 | Cho et al. |
| 9,456,744 B2 | 10/2016 | Popovich et al. |
| 9,891,363 B2 | 2/2018 | Ayres et al. |
| 2002/0093701 A1 | 7/2002 | Zhang et al. |
| 2002/0191394 A1 | 12/2002 | Coleman et al. |
| 2003/0090753 A1 | 5/2003 | Takeyama et al. |
| 2003/0179364 A1 | 9/2003 | Steenblik et al. |
| 2008/0309998 A1 | 12/2008 | Nakamura |
| 2009/0285528 A1 | 11/2009 | Chang et al. |
| 2013/0038935 A1 | 2/2013 | Moussa et al. |
| 2013/0250430 A1 | 9/2013 | Robbins et al. |
| 2013/0322813 A1* | 12/2013 | Grondin ................ B82Y 20/00 385/14 |
| 2014/0104665 A1 | 4/2014 | Popovich et al. |
| 2014/0131586 A1 | 5/2014 | Wang et al. |
| 2014/0140654 A1 | 5/2014 | Brown et al. |
| 2014/0218801 A1 | 8/2014 | Simmonds et al. |
| 2015/0077312 A1 | 3/2015 | Wang |
| 2015/0205126 A1 | 7/2015 | Schowengerdt |
| 2015/0255946 A1 | 9/2015 | Kitamura |
| 2016/0104996 A1 | 1/2016 | Klennert |
| 2016/0109713 A1 | 4/2016 | Osterhout |
| 2016/0154150 A1 | 6/2016 | Simmonds et al. |
| 2017/0031160 A1 | 2/2017 | Popovich et al. |
| 2017/0059759 A1 | 3/2017 | Ayres |
| 2017/0276940 A1 | 9/2017 | Popovich et al. |

* cited by examiner

US 10,649,216 B2

LIGHT HOMOGENIZATION

CROSS-REFERENCE TO RELATED PATENT APPLICATIONS

This application is a continuation of U.S. patent application Ser. No. 15/479,252, filed Apr. 4, 2017, which claims the benefit of U.S. Provisional Application No. 62/318,039, filed 4 Apr. 2016, U.S. Provisional Application No. 62/318,917, filed 6 Apr. 2016, and U.S. Provisional Application No. 62/412,728, filed 25 Oct. 2016, each of which is hereby incorporated by reference herein in its entirety.

FIELD OF TECHNOLOGY

The present disclosure relates generally to optical reflective devices, and more specifically to light homogenization.

BACKGROUND

Optical waveguides have a physical structure that guides electromagnetic waves in the optical spectrum (e.g., light). In some cases, an optical waveguide can be an optical fiber or a planar waveguide structure. An optical waveguide can use total internal reflection (TIR) to guide light to an output. Depending on an incidence angle of light with respect to surface normal of a TIR surface, the intensity or power distribution of the light may vary. Thus, an area of an optical waveguide may receive more or less energy from the light being guided due to the incidence angle of the light. In some cases, this spatially-inhomogeneous power distribution is irrelevant to the operation of the optical waveguide. In other cases, however, inhomogeneity of light propagated through a waveguide can result in performance deficits for certain TIR device applications. Accordingly, it may be beneficial to homogenize the power distribution of light for a particular area of an optical waveguide or TIR device.

A TIR imaging device may suffer performance deficits due to mode inhomogeneity of light propagated through a waveguide. For example, light may enter a waveguide, propagate through the waveguide, and reflect towards an exit pupil to form a projected image. The waveguide may include a light coupling device (e.g., an input coupler, cross coupler and/or output coupler). However, light propagated through the waveguide may exhibit spatially-inhomogeneous power distribution within the coupled modes. This spatially-inhomogeneous power distribution may also lead to a non-uniform intensity profile at the light coupling device. Accordingly, this non-uniform intensity profile may broaden a point spread function associated with an output beam reflected towards the exit pupil thereby reducing a resolution of the projected image and resulting in non-uniform brightness of the projected image.

SUMMARY

The described features generally relate to one or more improved methods, systems, or devices for homogenizing light. The methods, systems, or devices may employ one or more light homogenizers or homogenizing techniques to change the power distribution of light in a waveguide or TIR device.

In accordance with aspects of the subject technology, an optical device may include a waveguide having a first waveguide surface and a second waveguide surface parallel to the first waveguide surface. The optical device may also include a partially reflective element located between the first waveguide surface and the second waveguide surface. The partially reflective element may have a reflective axis parallel to a waveguide surface normal.

A method is described. The method may include forming a waveguide having a first waveguide surface and a second waveguide surface parallel to the first waveguide surface and forming a partially reflective element located between the first waveguide surface and the second waveguide surface, the partially reflective element having a reflective axis parallel to a waveguide surface normal.

In some examples of the optical device described above, the partially reflective element may be configured to reflect light incident on the partially reflective element at a first reflectivity for a first set of incidence angles and to reflect light incident on the partially reflective element at a second reflectivity for a second set of incident angles, the first reflectivity being different from the second reflectivity.

In some examples of the optical device described above, the waveguide comprises a first layer having parallel plane surfaces and a second layer having parallel plane surfaces. Some examples of the optical device or system described above may also include an interior plane surface of the parallel plane surfaces of the first layer abuts an interior plane surface of the parallel plane surfaces of the second layer. In some examples of the optical device described above, the first waveguide surface may be a plane surface of the first layer opposite the interior plane surface of the parallel plane surfaces of the first layer. In some examples of the optical device described above, the second waveguide surface may be a plane surface of the second layer opposite the interior plane surface of the parallel plane surfaces of the second layer.

In some examples of the optical device described above, the first layer and the second layer may have matched indices of refraction. In some examples of the optical device described above, the partially reflective element may be a partially reflective coating disposed on one or both of the interior plane surface of the parallel plane surfaces of the first layer or the interior plane surface of the parallel plane surfaces of the second layer.

In some examples of the optical device described above, the first layer may have an index of refraction different from the second layer. In some examples of the optical device described above, the partially reflective element may be a boundary condition associated with the first layer and the second layer.

Some examples of the optical device or system described above may also include a light coupling device disposed within at least one of the first layer or the second layer of the waveguide. The light coupling device may comprise a grating medium. Some examples of the optical device or system described above may also include a first grating structure within the grating medium, the first grating structure being configured to reflect light of a wavelength about a first reflective axis offset from the waveguide surface normal at a first incidence angle. Some examples of the optical device or system described above may also include a second grating structure within the grating medium, the second grating structure being configured to reflect light of the wavelength about a second reflective axis offset from the waveguide surface normal at a second incidence angle different from the first incidence angle.

In some examples of the optical device described above, the at least one of the first grating structure or the second grating structure comprises a hologram. In some examples of the optical device described above, the at least one of the first grating structure or the second grating structure comprises a non-holographic diffractive optical element.

In some examples of the optical device described above, the partially reflective element at least partially overlaps the grating medium in a direction orthogonal to a plane of the first waveguide surface. In some examples of the optical device described above, the partially reflective element may be configured to reflect between 40% and 60% of light incident on the partially reflective element.

In some examples of the optical device described above, the partially reflective element comprises a partially reflective plate disposed within the waveguide. The partially reflective plate may comprise a plate surface parallel to the first waveguide surface.

In some examples of the optical device described above, the partially reflective element comprises a first partially reflective plate and a second partially reflective plate disposed within the waveguide. Each of the first and second partially reflective plates may comprise a plate surface parallel to the first waveguide surface. Each of the first and second partially reflective plates may be configured to reflect between 10% and 90% of light incident on a respective one of the first and second partially reflective plates.

Some examples of the optical device or system described above may also include a grating medium. Some examples of the optical device or system described above may also include a first grating structure within the grating medium, the first grating structure being configured to reflect light of a wavelength about a first reflective axis parallel to the waveguide surface normal at a first incidence angle. Some examples of the optical device or system described above may also include a second grating structure within the grating medium, the second grating structure being configured to reflect light of the wavelength about a second reflective axis parallel to the waveguide surface normal waveguide at a second incidence angle different from the first incidence angle.

In some examples of the optical device described above, the at least one of the first grating structure or the second grating structure comprises a hologram. In some examples of the optical device described above, the at least one of the first grating structure or the second grating structure comprises a non-holographic diffractive optical element.

In some examples of the optical device described above, the grating medium may be configured to reflect between 10% and 90% of the light of the wavelength incident on the grating medium. In some examples of the optical device described above, the each of the first incidence angle and the second incidence angle may have a value between 65° and 77° with respect to the waveguide surface normal.

In some examples of the optical device described above, the grating medium may be configured to allow a majority of light of the wavelength to pass through the grating medium at a third incidence angle different from the first incidence angle and the second incidence angle.

In some examples, an optical device or system may include a light source for providing image-bearing light and an optical lens. The optical lens may include a light input section of the optical lens for receiving the image-bearing light, a waveguide disposed within the optical lens operatively coupled to the light input section, and a light coupling device operatively coupled to the waveguide medium. The waveguide may have a first waveguide surface and a second waveguide surface parallel to the first waveguide surface. A partially reflective element may be located between the first waveguide surface and the second waveguide surface. The partially reflective element may have a reflective axis parallel to the waveguide surface normal.

A method is described. The method may include forming a light source for providing image-bearing light and forming an optical lens. The optical lens may include a light input section of the optical lens for receiving the image-bearing light, a waveguide disposed within the optical lens operatively coupled to the light input section, and a light coupling device operatively coupled to the waveguide medium. The waveguide may have a first waveguide surface and a second waveguide surface parallel to the first waveguide surface. A partially reflective element may be located between the first waveguide surface and the second waveguide surface. The partially reflective element may have a reflective axis parallel to the waveguide surface normal.

The method may include forming a light input section of the optical lens for receiving the image-bearing light, forming a waveguide disposed within the optical lens operatively coupled to the light input section, the waveguide having a first waveguide surface and a second waveguide surface parallel to the first waveguide surface, forming a partially reflective element located between the first waveguide surface and the second waveguide surface, the partially reflective element having a reflective axis parallel to the waveguide surface normal, and forming a light coupling device operatively coupled to the waveguide medium.

A method is described. The method may include propagating light in a TIR waveguide having a first waveguide surface and a second waveguide surface parallel to the first waveguide surface and reflecting a portion of the light via a partially reflective element located between the first waveguide surface and the second waveguide surface, the partially reflective element having a reflective axis parallel to a waveguide surface normal.

An apparatus is described. The apparatus may include means for propagating light in a TIR waveguide having a first waveguide surface and a second waveguide surface parallel to the first waveguide surface and means for reflecting a portion of the light via a partially reflective element located between the first waveguide surface and the second waveguide surface, the partially reflective element having a reflective axis parallel to a waveguide surface normal.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
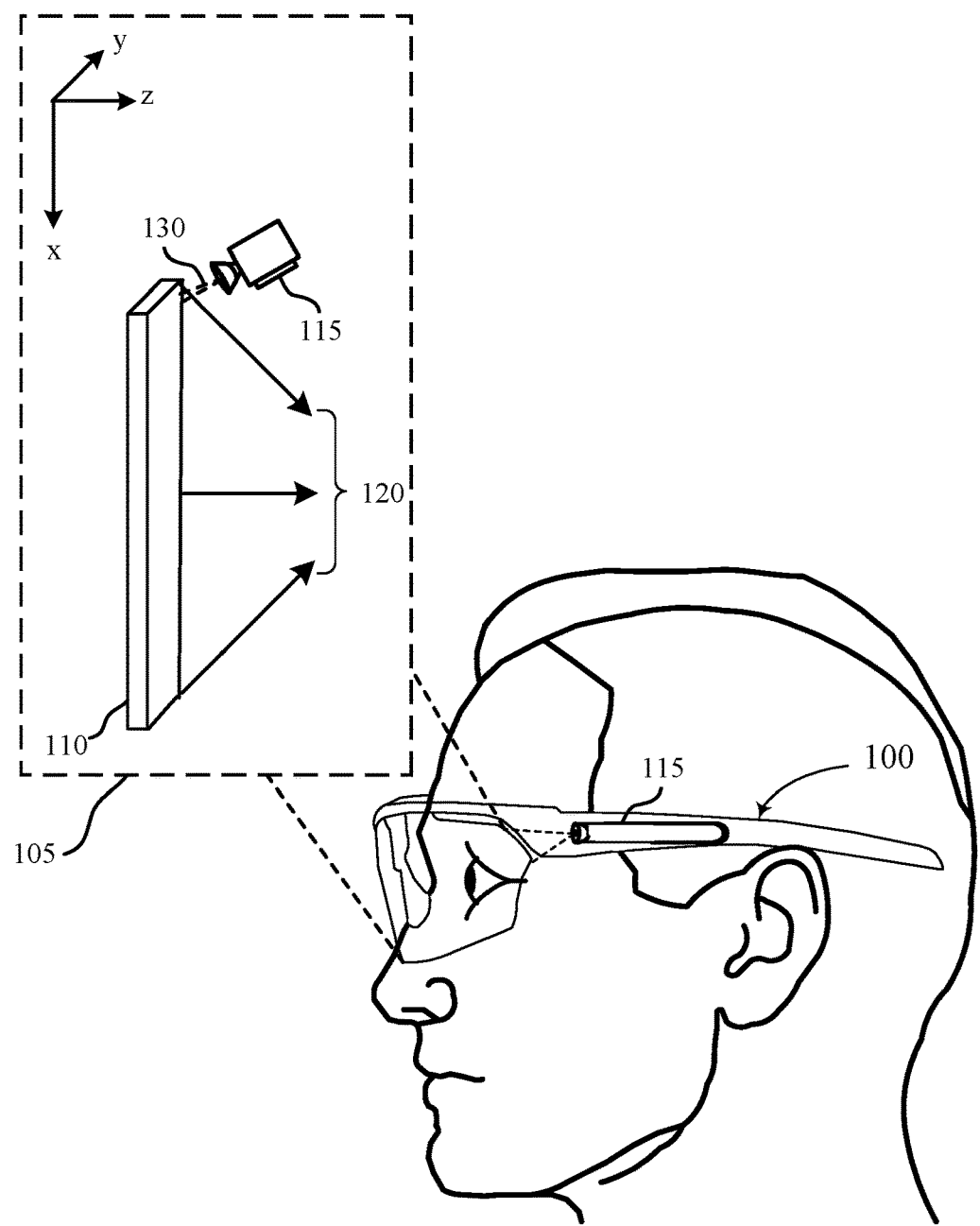
FIG. 1 is an illustration of a head mounted display (HMD) in which the principles included herein may be implemented.

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

An optical head-mounted display (HMD) is a wearable device that has the capability of reflecting projected images as well as allowing a user to experience augmented reality. Head-mounted displays typically involve near-eye optics to create "virtual" images. In the past HMDs have dealt with a variety of technical limitations that reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal. The reflective axis of a conventional mirror may lead to suboptimal orientation or performance of the mirror. Also, conventional grating structures may include multiple reflective axes that covary unacceptably with incidence angle and/or wavelength.

Accordingly, a device for reflecting light may include features that reflect light about a reflective axis not constrained to surface normal and whose angle of reflection for a given angle of incidence is constant at multiple wavelengths. Embodiments of the device may have substantially constant reflective axes (i.e., reflective axes that have reflective axis angles that vary by less than 1.0 degree) across a range of incidence angles for incident light of a given wavelength, and this phenomenon may be observed with incident light at various wavelengths.

In some examples, a waveguide may include one or more light homogenizing elements to minimize the point spread function of the output beam and improve projected image qualities such as resolution and brightness. For example, a light homogenizing element may be a partially reflective element positioned parallel to the waveguide surfaces. In some cases, the partially reflective element may be disposed at the substrate interfaces of the waveguide or throughout the waveguide itself. In some examples, the partially reflective element may be an optical element (e.g., a skew mirror) with a reflective axis perpendicular to the waveguide surface. A light homogenizing element may split the energy of the propagating light. For example, a first portion of the energy of light propagating in a first mode direction (e.g., a downward ray direction) incident on a surface of the light homogenizing element may reflect in a second mode direction (e.g., an upward ray direction) different from the first mode direction. A second portion of the energy of light propagating in the first mode direction incident on the surface of the light homogenizing element may refract or continue propagating in the first mode direction.

Aspects of the disclosure are initially described in the context of an apparatus for reflecting light towards an eye box situated at a fixed distance away from a skew mirror. Specific examples are described for apparatus including a grating medium. The grating medium may include one or more grating structures. A grating structure may be configured to reflect light of a particular wavelength about a reflective axis offset from a surface normal of the grating structure at a particular plurality of incident angles. Aspects of the disclosure are further illustrated by and described with reference to apparatus diagrams, system diagrams, and flowcharts that relate to light homogenization.

This description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of a head mounted display (HMD) 100 in which the principles included herein may be implemented. The HMD 100 may include eyewear or headwear in which a near-eye display (NED) 105 may be affixed in front of a user's eyes. The NED 105 may include a diffractive element portion disposed within or incorporated with a lens assembly of the HMD 100. In some examples, the diffractive element portion is a holographic optical element (HOE), which may be comprised of a skew mirror 110. Coordinates (x, y, and z-axis) are provided with reference to the skew mirror 110. The HMD 100 may include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 is a reflective device which may include a grating medium within which resides volume holograms or other grating structure. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, has physical properties that allow it to diffract light about an axis, referred to as a reflective axis, wherein angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations typically have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams according to the intensity of the initial interference pattern. The grating medium may include a photopolymer, photorefractive crystals, dichromated gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. Where the recording beams intersect, they interact with the recording medium in a way that varies according to the intensity of each point of the interference pattern. This creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post-recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. Grating mediums have typically been rendered non-photosensitive.

In some implementations, the grating structure includes a hologram generated by interference between multiple light beams referred to as recording beams. Typically, but not necessarily, the grating structure includes multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed). In some implementations, the grating structure includes a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some examples, the lens assembly and skew mirror 110 may be substantially flat with respect to the x-y plane; however, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more holograms or sinusoidal volume gratings which may overlap with each other. In some embodiments, either holograms or non-holography sinusoidal volume gratings are used in the grating medium. In other embodiments, both holograms and non-holography sinusoidal volume gratings may be used in the same grating medium. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a given incidence angle. These different grating structures may be superimposed within the grating medium of the skew mirror 110. The skew mirror 110 may have a substantially constant reflective axis (i.e., each grating structure of the skew mirror 110 has a same substantially constant reflective axis).

In some examples, a head mounted display device may comprise a light source or light projector 115 for providing image-bearing light and a lens assembly. The lens assembly may include skew mirror 110. The lens assembly may comprise a light input section for receiving the image-bearing light from the light source or light projector 115. A waveguide may be disposed within the lens assembly and be operatively coupled to the light input section. The waveguide may comprise at least two substrates (not shown), a grating medium disposed between the at least two substrates, a first grating structure within the grating medium, and a second grating structure within the grating medium. In some examples, the waveguide may be omitted and the light source or light projector 115 may be operatively coupled to the lens assembly in a free space configuration. The first grating structure may be configured to reflect light of a wavelength about a first reflective axis of the first grating structure offset from a surface normal of the grating medium. The first grating structure may be configured to reflect light at a first incidence angle. The second grating structure may be configured to be at least partially non-overlapping with the first grating structure. The second grating structure may be configured to reflect light of the same wavelength as light reflected by the first grating structure. The second grating structure may be configured to reflect light of the wavelength about a second reflective axis of the second grating structure offset from the surface normal of the grating medium. The second grating structure may be configured to reflect light at a second incidence angle different from the first incidence angle.

Inventive aspects of the present disclosure are illustrated by the non-limiting examples of FIG. 1. For example, an imaging component such as a light source (e.g., light source or light projector 115) may be provide image-bearing light. A waveguide component such as optical lens or the like may include a light input section. The light input section of the optical lens may receive the image-bearing light. A waveguide may be disposed within the optical lens and be operatively coupled to the light input section. In some cases, the waveguide may have a first waveguide surface and a second waveguide surface parallel to the first waveguide surface. A homogenizing component may be included within the waveguide. For example, a partially reflective element may be located between the first waveguide surface and the second waveguide surface. The partially reflective element may have a reflective axis parallel to a waveguide surface normal. A coupling component such as a light coupling device may be operatively coupled to the waveguide medium.

Additional examples and various implementations are contemplated using the light homogenizing techniques described herein.

Figure 2A:
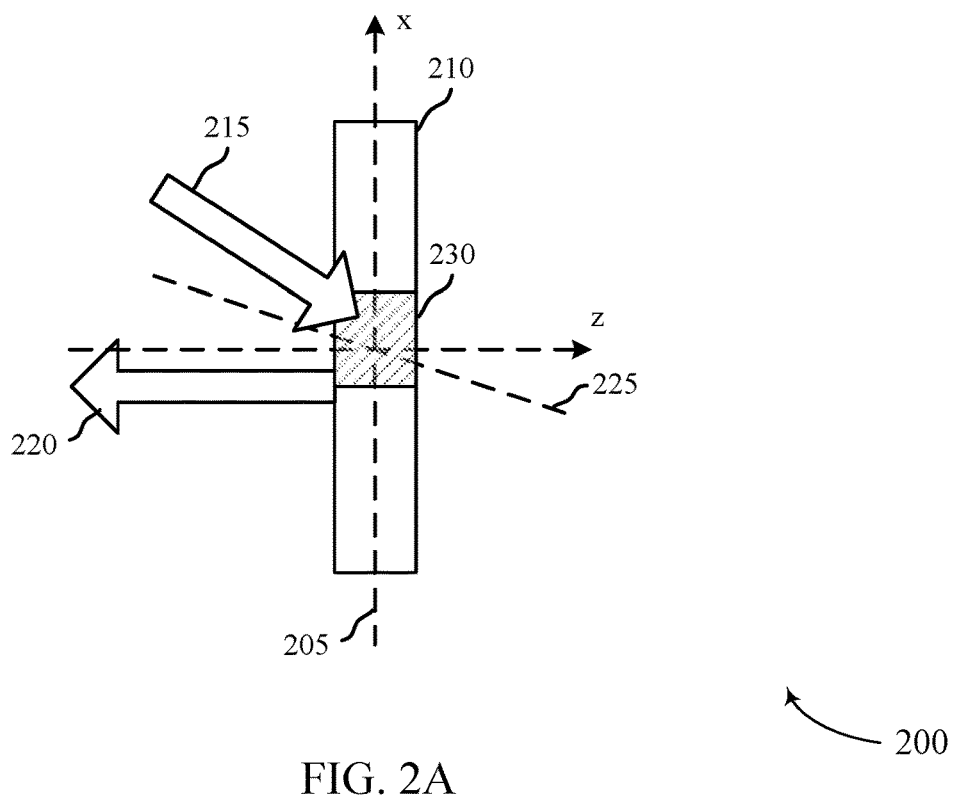
FIG. 2A is a diagram illustrating reflective properties of a skew mirror in real space in accordance with various aspects of the disclosure.

FIG. 2A is a cross-section view 200 illustrating reflective properties of a skew mirror 210 in real space according to one example. The cross-section view 200 may include a grating structure such as hologram 230 in a grating medium.

FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for light coupling and/or pupil equalization may be partially reflective. For example, a skew mirror for pupil equalization may be configured to selectively reflect the rays of light where they are needed to form an exit pupil towards an eye box. The skew mirror for pupil equalization may be configured to avoid reflecting the rays of light for certain incidence angles where such a reflection would reflect the rays of light to an area that is not toward the desired exit pupil. Implementations of some skew mirror embodiments may require relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness. In some cases, pupil equalization techniques are not employed by a skew mirror that is used as a light coupling device. The skew mirror 205 is characterized by the reflective axis 225 at an angle measured with respect to the z axis. The z axis is normal to the skew mirror axis 210. The skew mirror 205 is illuminated with the incident light 215 with an internal incidence angle that is measured with respect to the z axis. The principal reflected light 220 may be reflected with internal reflection angle 180° measured with respect to the z axis. The principal reflected light 220 may correspond to wavelengths of light residing in the red, green, and blue regions of the visible spectrum.

The skew mirror 210 is characterized by the reflective axis 225 at an angle measured with respect to the z-axis. The z-axis is normal to the skew mirror axis 205. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 210 may have multiple hologram regions which all share substantially the same reflective axis 225. These multiple regions, however, may each reflect light for different ranges of angles of incidence. For example, the bottom third of a HOE containing the skew mirror 210 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
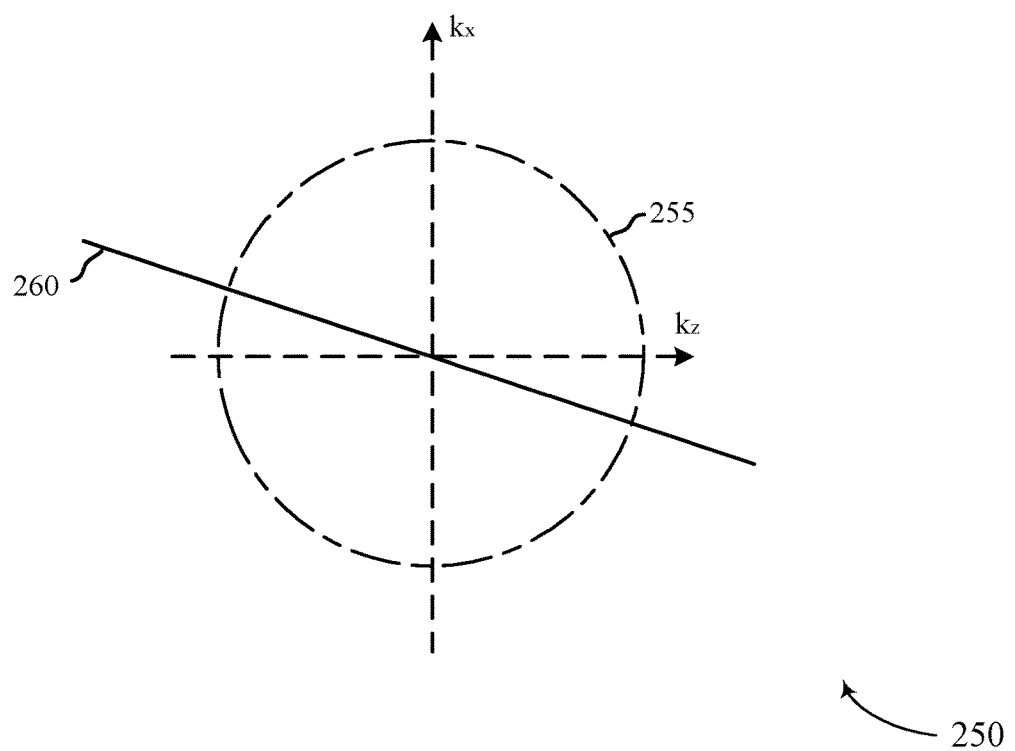
FIG. 2B illustrates a skew mirror in k-space in accordance with various aspects of the disclosure.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 passes through the origin, and has an angle measured with respect to the z-axis, equal to that of the reflective axis 225. Recording k-sphere 255 is the k-sphere corresponding to a particular writing wavelength. K-space 250 may include various k-spheres corresponding to wavelengths of light residing in the red, green, and blue regions of the visible spectrum.

The k-space formalism is a method for analyzing holographic recording and diffraction. In k-space, propagating optical waves and holograms are represented by three dimensional Fourier transforms of their distributions in real space. For example, an infinite collimated monochromatic reference beam can be represented in real space and k-space by equation (1):

$$E_r(\vec{r}) = A_r \exp(i\, \vec{k}_r \cdot \vec{r}) \xrightarrow{\mathcal{F}} E_r(\vec{k}) = A_r\, \delta(\vec{k} - \vec{k}_r), \quad (1)$$

where $E_r(\vec{r})$ is the optical scalar field distribution at all $\vec{r} = \{x,y,z\}$ 3D spatial vector locations, and its transform $E_r(\vec{k})$ is the optical scalar field distribution at all $\vec{k} = \{k_x, k_y, k_z\}$ 3D spatial frequency vectors. $A_r$ is the scalar complex amplitude of the field; and $\vec{k}_r$ is the wave vector, whose length indicates the spatial frequency of the light waves, and whose direction indicates the direction of propagation. In some implementations, all beams are composed of light of the same wavelength, so all optical wave vectors must have the same length, i.e., $|\vec{k}_r| = k_n$. Thus, all optical propagation vectors must lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms usually consist of spatial variations of the index of refraction within a grating medium. The index of refraction spatial variations, typically denoted $\Delta n(\vec{r})$, can be referred to as index modulation patterns, the k-space distributions of which are typically denoted $\Delta n(\vec{k})$. The index modulation pattern created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r}) E_2(\vec{r}) + E_1(\vec{r}) E_2^*(\vec{r}), \quad (2)$$

where $E_1(\vec{r})$ is the spatial distribution of the first recording beam field and $E_2(\vec{r})$ is the spatial distribution of the second recording beam field. The unary operator "*" denotes complex conjugation. The final term in equation (2), $E_1(\vec{r}) E_2^*(\vec{r})$, maps the incident second recording beam into the diffracted first recording beam. Thus the following equation may result:

$$E_1(\vec{r}) E_2^*(\vec{r}) \xrightarrow{\mathcal{F}} E_1(\vec{k}) \otimes E_2(\vec{k}) \quad (3)$$

where $\otimes$ is the 3D cross correlation operator. This is to say, the product of one optical field and the complex conjugate of another in the spatial domain becomes a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ are grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam are angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k}) \big|_{|\vec{k}|=k_n}, \quad (4)$$

where $E_d(\vec{k})$ and $E_p(\vec{k})$ are k-space distributions of the diffracted beam and the probe beam, respectively; and "*" is the 3D convolution operator. The notation "$\big|_{|\vec{k}|=k_n}$" indicates that the preceding expression is evaluated only where $|\vec{k}| = k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

Typically, when the probe beam resembles one of the recording beams used for recording, the effect of the convolution is to reverse the cross correlation during recording, and the diffracted beam will substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, typically used here when describing skew mirror properties in k-space, is analogous to the term incident light, which is typically used here when describing skew mirror reflective properties in real space. Similarly, the term diffracted beam, typically used here when describing skew mirror properties in k-space, is analogous to the term principal reflected light, typically used here when describing skew mirror properties in real space. Thus when describing reflective properties of a skew mirror in real space, it is typical to state that incident light is reflected by a hologram (or other grating structure) as principal reflected light, though to state that a probe beam is diffracted by the hologram to produce a diffracted beam says essentially the same thing. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3A:
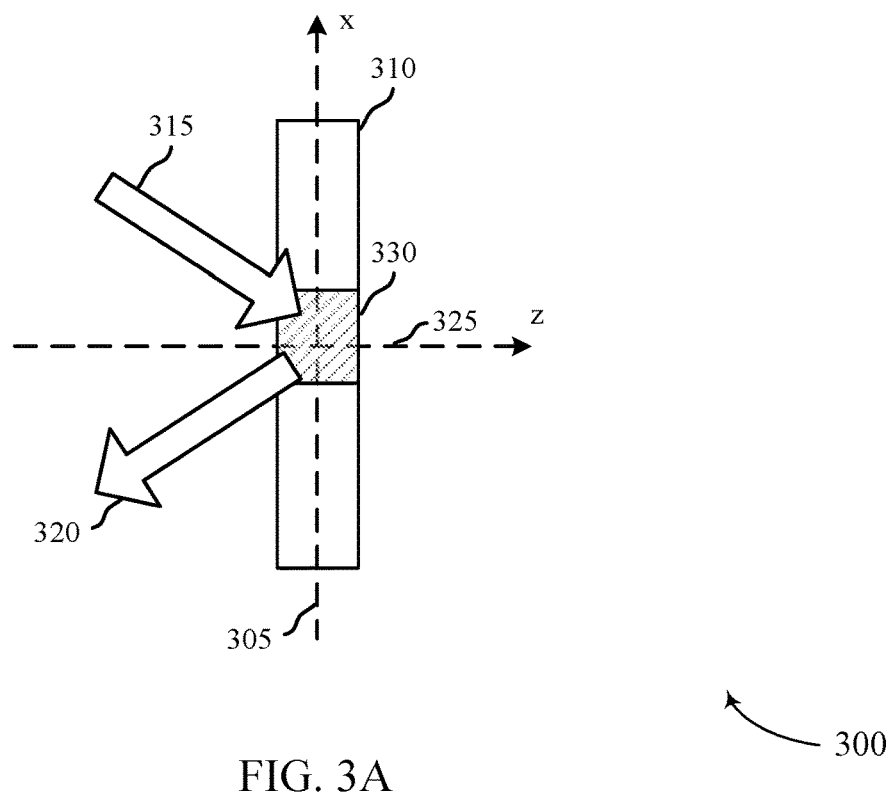
FIG. 3A is a diagram illustrating reflective properties of a skew mirror in real space in accordance with various aspects of the disclosure.

FIG. 3A is a cross-section view 300 illustrating reflective properties of a skew mirror 310 in real space according to one example. The cross-section view 300 may include a grating structure such as hologram 330 in a grating medium. FIG. 3A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for light homogenization may be partially reflective. In this manner, a skew mirror for light homogenization may be configured to selectively reflect the rays of light where propagating light may need to be homogenized. The skew mirror for light homogenization may be configured to avoid reflecting the rays of light for certain incidence angles where such a reflection may not be beneficial. Implementations of some skew mirror embodiments may require relatively high dynamic range recording medium to achieve high reflectivity over a relatively wide wavelength bandwidth and angle range for the resulting grating medium. In some cases, a skew mirror for light homogenization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of equal brightness. The skew mirror 305 is characterized by the reflective axis 325 at an angle measured with respect to the z axis. The z axis is normal to the skew mirror axis 310. The reflective axis 325 may be coincident with the surface normal. The skew mirror 305 is illuminated with the incident light 315 with an internal incidence angle that is measured with respect to the z axis. The principal reflected light 320 may be reflected with an internal reflection angle that is equal to the internal incidence angle measured with respect to the z axis. The principal reflected light 320 may correspond to wavelengths of light residing in the red, green, and blue regions of the visible spectrum.

In some examples, the principal reflected light 320 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 320 may correspond to wavelengths of light residing outside of the visible spectrum (e.g., infrared and ultraviolet wavelengths).

The skew mirror 310 may have multiple hologram regions which all share substantially the same reflective axis 325. These multiple regions, however, may each reflect light for different ranges of angles of incidence. For example, the bottom third of a HOE containing the skew mirror 310 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 3B:
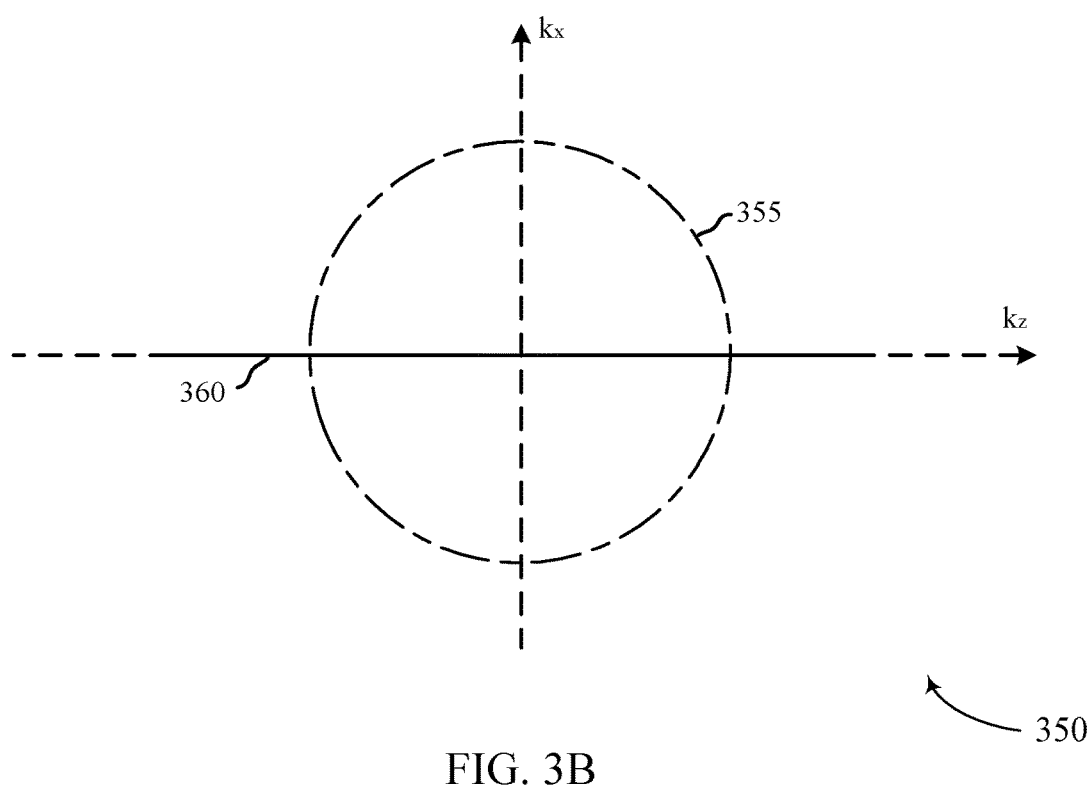
FIG. 3B illustrates a skew mirror in k-space in accordance with various aspects of the disclosure.

FIG. 3B illustrates a k-space representation 350 of the skew mirror 310 of FIG. 3A. The k-space distributions of spatially varying refractive index components are typically denoted $\Delta n(\vec{k})$. $\Delta n(\vec{k})$ k-space distribution 360 passes through the origin, and is coincident with the z-axis, equal to that of the reflective axis 325. The reflective axis 325 is substantially parallel to surface normal. Recording k-sphere 355 is the k-sphere corresponding to a particular writing wavelength. K-space 350 may include various k-spheres corresponding to wavelengths of light residing in the red, green, and blue regions of the visible spectrum.

The k-space formalism method for analyzing holographic recording and diffraction associated with k-space representation 350 may be performed as described above with respect to FIG. 2A.

Figure 4A:
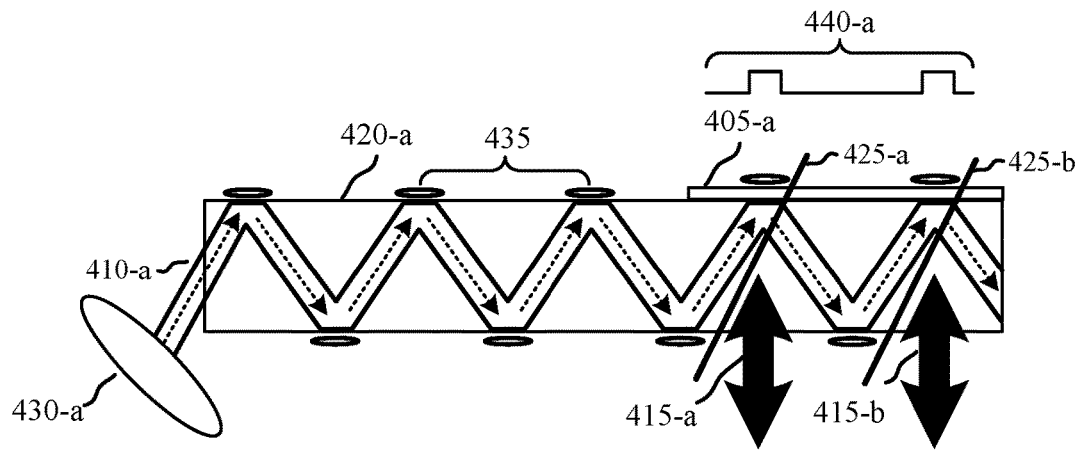
FIGS. 4A-4B illustrate an example of an optical system that supports light homogenization in accordance with aspects of the present disclosure.

FIG. 4A illustrates an example of an optical system 400-*a* that supports light homogenization in accordance with various aspects of the present disclosure. Optical system 400-*a* may be utilized in an application such as, but not limited to, a head mounted display. The optical system 400-*a* may employ selective coupling to allow a light coupling device 405-*a* to reflect light 410-*a* towards a specific location and project replicated pupils 415-*a* and 415-*b*. The represented angles are internal angles relative to the surface normal of the waveguide 420-*a*, and the refraction at the substrate interface, as well as at the substrate air interface, is ignored for the purpose of illustration. Replicated pupils 415-*a* and 415-*b* may project an image corresponding to reflective axis 425-*a* and 425-*b*, respectively. Light coupling device 405-*a* may include a grating medium and a grating structure within the grating medium. The grating structure may have a plurality of holograms or sinusoidal volume gratings.

Optical system 400-*a* illustrates a light source 430-*a* where light 410-*a* enters the waveguide 420-*a*. In order for reflected light 410-*a* to be reflected towards the light coupling device 405-*a* and project replicated pupils 415-*a* and 415-*b*, light 410-*a* may propagate through the waveguide 420-*a* by total internal reflection. For example, light 410-*a* may propagate through waveguide 420-*a* and reflect between a downward mode direction and an upward mode direction. Light 410-*a* may be an example of light from one pixel (e.g., an image point) and have a corresponding width (e.g., the pupil width). In some examples, light 410-*a* may be an example of light from multiple pixels.

In some cases, reflected light 410-*a* in a TIR device may experience mode inhomogeneity. For example, gap 435 caused by TIR modes (e.g., spatial modes along a direction of propagation) of the light may be present between the consecutive interactions of light and the surface of the waveguide. In some cases, propagating light 410-*a* having large angles of incidence with respect to surface normal of waveguide 420-*a* may increase the size of gap 435 between the interaction of light 410-*a* and waveguide 420-*a*. Depending on a size of gap 435 caused by coupled mode of light 410-*a*, light 410-*a* reflecting within waveguide 420-*a* may only partially interact with light coupling device 405-*a*. This partial interaction in the non-overlapping mode inhomogeneity example of FIG. 4A may cause a non-uniform intensity profile at the light coupling device 405-*a*. The non-uniform intensity profile may result in a spatially-inhomogeneous power distribution 440-*a*. The spatially-inhomogeneous power distribution 440-*a* may cause a broadening of the point spread function (PSF) of an output beam associated with replicated pupils of the light coupling device 405-*a* thereby reducing the resolution of the projected image.

Figure 4B:
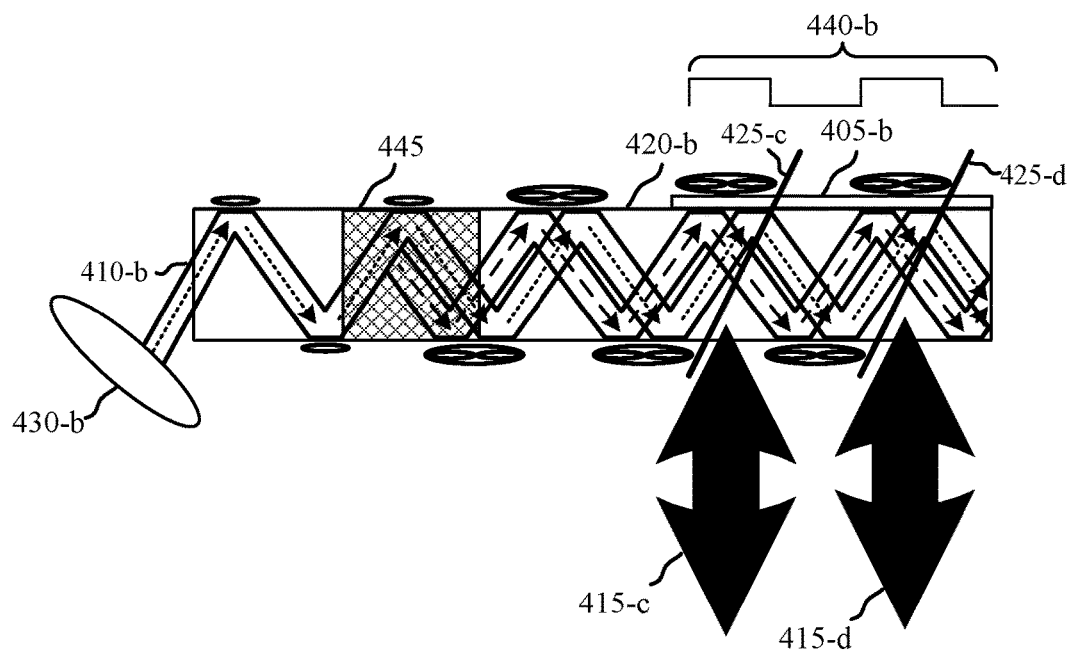

FIG. 4B illustrates a diagram of an optical system 400-*b* incorporating light homogenization. Optical system 400-*b* may be utilized in an application such as a head mounted display. The optical system 400-*b* may employ selective coupling to allow a light coupling device 405-*b* to reflect light 410-*b* towards a specific location and project replications 415-*c* and 415-*d*. The represented angles are internal angles relative to the surface normal of the waveguide 420-*b*, and the refraction at the substrate interface, as well as at the substrate air interface, is ignored for the purpose of illustration. Replicated pupils 415-*c* and 415-*d* may project an image corresponding to reflective axis 425-*c* and 425-*d*, respectively. Light coupling device 405-*b* may include a grating medium and a grating structure within the grating medium. The grating structure may have a plurality of holograms or sinusoidal volume gratings.

Optical system 400-*b* illustrates a light source 430-*b* where light 410-*b* enters the waveguide 420-*b*. In order for reflected light 410-*b* to be reflected towards the light coupling device 405-*b* and project replicated pupils 415-*c* and 415-*d*, light 410-*b* may propagate through the waveguide 420-*b* by total internal reflection. For example, light 410-*b* may propagate through waveguide 420-*b* and reflect between a downward mode direction and an upward mode direction. Light 410-*b* may be an example of light from one pixel (e.g., an image point) and have a corresponding width (e.g., the pupil width). In some examples, light 410-*b* may be an example of light from multiple pixels. In some cases, light 410-*b* may propagate down waveguide 420-*b* in one mode. In other examples, light 410-*b* may propagate down waveguide 420-*b* in multiple modes. That is, multiple reflections of light 410-*b* may occur along the surface of waveguide 420-*b*.

In some implementations, light homogenizing element 445 may disposed proximal to where light 410-*b* enters waveguide 420-*b*. Light 410-*b* may propagate through light homogenizing element 445, down waveguide medium 420-*b*, reflect off light coupling device 405-*b* and project substantially homogenous replicated pupils 415-*c* and 415-*d*. The light homogenizing element 445 may split the energy of the propagating light 410-*b*. In some cases, each portion of light 410-*b* may further propagate through the waveguide 420-*b* in both a first mode direction (e.g., a downward ray direction) and a second mode direction (e.g., an upward ray direction) different from the first mode direction. For example, each portion of light 410-*b* may reflect off light coupling device 405-*b* and project replicated pupils 415-*c* and 415-*d* with a uniform intensity profile. In some examples, the uniform intensity profile may represent partial homogenization. The uniform intensity profile at light coupling device 405-*b* may result in a partially spatially-homogeneous power distribution 440-*b*. In some substantially and fully homogenous replicated pupils cases, the intensity profile at light coupling device 405-*b* may result in a step-wise function power distribution where each portion of light may overlap and reflect off light coupling device 405-*b*. Partially spatially-homogeneous power distribution 440-*b* may narrow the PSF of an output beam associated with the replicated pupils 415-*c* and 415-*d* when compared to spatially-inhomogeneous power distribution 440-*a*.

Inventive aspects of the present disclosure are illustrated by the non-limiting examples of FIG. 4B. For example, a waveguide may have a first waveguide surface and a second waveguide surface parallel to the first waveguide surface. A partially reflective element (e.g., light homogenizing element 445) may be located between the first waveguide surface and the second waveguide surface. The partially reflective element may have a reflective axis parallel to a waveguide surface normal.

In some cases, the partially reflective element is configured to reflect light incident on the partially reflective element at a first reflectivity for a first set of incidence angles and to reflect light incident on the partially reflective element at a second reflectivity for a second set of incident angles. The first reflectivity may be different from the second reflectivity. In some cases, the partially reflective element is configured to reflect between 40% and 60% of light incident on the partially reflective element.

Additional examples and various implementations are contemplated using the light homogenizing techniques described herein.

Figure 5A:
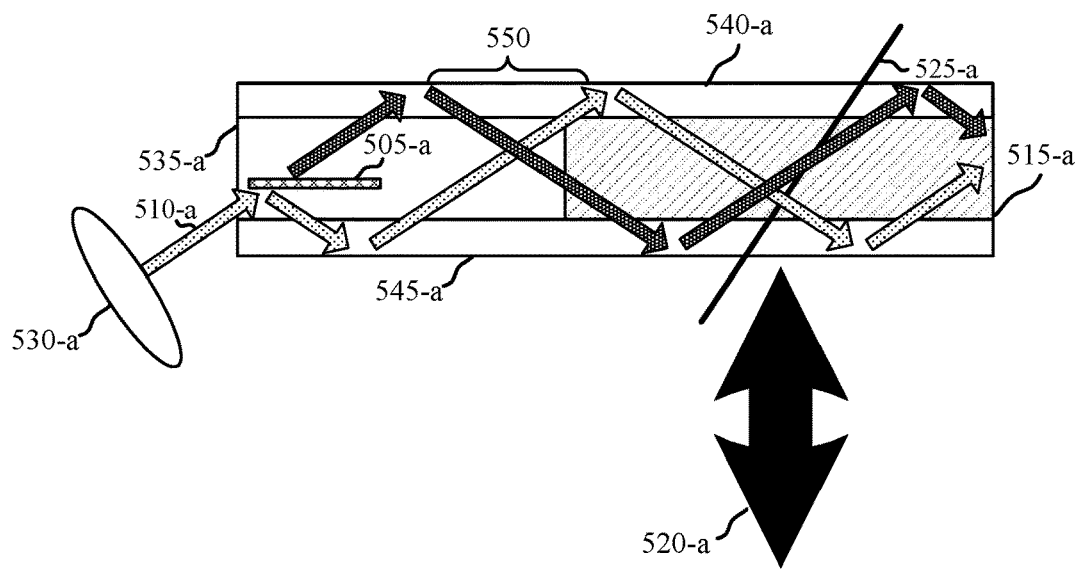
FIGS. 5A-5E illustrates an example of an optical system that supports light homogenization in accordance with aspects of the present disclosure.

FIG. 5A illustrates an example of an optical system 500-*a* that supports light homogenization in accordance with various aspects of the present disclosure. Optical system 500-*a* may be utilized in an application such as, but not limited to, a head mounted display. The optical system 500-*a* may employ selective coupling to allow a partially reflective element of light homogenizing element 505-*a* to reflect light 510-*a* towards a specific location. The represented angles are internal angles relative to the surface normal of the grating medium 515-*a*, and that refraction at the grating medium 515-*a* and/or the substrate interface, as well as at the substrate air interface, is ignored for the purpose of illustration. Replicated pupil 520-*a* may project an image corresponding to reflective axis 525-*a*. Grating medium 515-*a* may include a grating structure. The grating structure may have a plurality of holograms or sinusoidal volume gratings.

Optical system 500-*a* illustrates a light source 530-*a* where light 510-*a* enters the waveguide medium 535-*a*. In order for light 510-*a* to be reflected and project replicated pupil 520-*a*, light 510-*a* may propagate through the waveguide medium 535-*a* by total internal reflection. For example, light 510-*a* may propagate through waveguide medium 535-*a* and reflect between a downward mode direction and an upward mode direction. Light 510-*a* may be an example of light from one pixel (e.g., an image point) and have a corresponding width (e.g., the pupil width). In some examples, light 510-*a* may be an example of light from multiple pixels.

Optical system 500-*a* may include a grating medium 515-*a* located at least partially within a waveguide medium 535-*a*. Grating medium 515-*a* may be implemented in a light coupling device (e.g., an input coupler, a cross coupler, or an output coupler) located within waveguide medium 535-a. In some cases, light homogenizing element 505-a may include a partially reflective element (e.g., with 50% reflectivity in some cases, but between 10% and 90% reflectivity in general) and may be located parallel to the first substrate 540-a (e.g., a first layer) and second substrate 545-a (e.g., a second layer) of waveguide medium 535-a. In other cases, light homogenizing element 505-a may include a partially reflective element (e.g., between 33% and 67% reflectivity in some cases and between 10% and 90% reflectivity in other cases). In some examples, the reflectivity of the partially reflective element may be based on a thickness of the waveguide and waveguide components (e.g., substrates, grating media, etc.). For example, a waveguide with a total thickness of 200 microns may be optimized with a partially reflective element having approximately 33% reflectivity, whereas a waveguide with a total thickness of 2 mm may be optimized with a partially reflective element having approximately 50% reflectivity. In some embodiments, a partially reflective element may have between 10% and 90% reflectivity.

The partially reflective element of light homogenizing element 505-a may be a metallic or dielectric material. A portion (e.g., half) of the incident light 510-a may refract or propagate through the partially reflective element and another portion of light 510-a may reflect off of the partially reflective element. In some cases, a first and second partially reflective plate of light homogenizing element 505-a may form a baffle. That is, the first partially reflective plate may be parallel and at least partially overlap the second partially reflective plate. In some examples, the first partially reflective plate may reflect light 510-a (e.g., a first set of incident angles) and the second partially reflective plate may reflect light 510-a (e.g., a second set of incident angles).

Reflectivity of the light homogenizing element 505-a may be spatially variable. For example, reflectivity of the light homogenizing element 505-a may vary throughout a length of the light homogenizing element 505-a. In some examples, the spatially variable light homogenizing element 505-a may vary from 50% to 0% reflectivity over a longitudinal distance of 2 mm. In other examples, the spatially variable light homogenizing element 505-a may vary from 0% to 50% to 0% reflectivity over a longitudinal distance of 2 mm. In some cases, light homogenizing element 505-a may have a center portion with a constant 50% reflectivity. The spatially variable light homogenizing element 505-a may also selectively reflect propagating light 510-a having a particular range of incidence angles with respect to surface normal of the waveguide.

Inventive aspects of the present disclosure are illustrated by the non-limiting examples of FIG. 5A. For example, a waveguide may have a first waveguide surface and a second waveguide surface parallel to the first waveguide surface. A partially reflective element (e.g., light homogenizing element 505-a) may be located between the first waveguide surface and the second waveguide surface. The partially reflective element may have a reflective axis parallel to a waveguide surface normal.

In some cases, the partially reflective element comprises a partially reflective plate disposed within the waveguide. The partially reflective plate may comprise a plate surface parallel to the first waveguide surface. In some cases, the partially reflective element comprises a first partially reflective plate and a second partially reflective plate disposed within the waveguide. Each of the first and second partially reflective plates may comprise a plate surface parallel to the first waveguide surface. Each of the first and second partially reflective plates may be configured to reflect 10% to 90% of light incident on a respective one of the first and second partially reflective plates.

Additional examples and various implementations are contemplated using the light homogenizing techniques described herein.

Figure 5B:
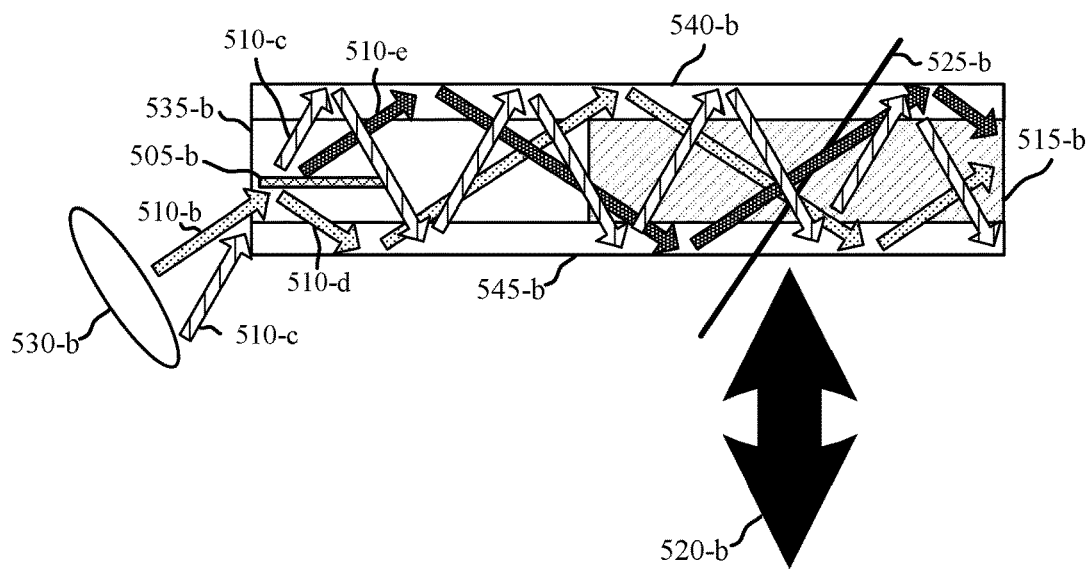

FIG. 5B illustrates a diagram of an optical system 500-b incorporating light homogenization. Optical system 500-b may be utilized in an application such as, but not limited to, a head mounted display. The optical system 500-b may employ selective coupling to allow a partially reflective element of light homogenizing element 505-b to reflect light 510-b towards a specific location. Refraction at the grating medium 515-b substrate interface, as well as at the substrate air interface, is ignored for the purpose of illustration in FIG. 5B. Replicated pupil 520-b may project an image corresponding to reflective axis 525-b. Grating medium 515-b may include a grating structure. The grating structure may have a plurality of holograms or sinusoidal volume gratings.

Optical system 500-b illustrates a light source 530-b where light 510-b and 510-c enters the waveguide medium 535-b. In order for light 510-b and 510-c to be reflected and project replicated pupil 520-b, light 510-b and 510-c may propagate through the waveguide medium 535-b by total internal reflection. For example, light 510-b and 510-c may propagate through waveguide medium 535-b and reflect between a downward mode direction and an upward mode direction. Based on incidence angle, light 510-b may be reflected by light homogenizing element 505-b whereas light 510-c is not reflected by light homogenizing element 505-b. Light 510-b and 510-c may be an example of light from one pixel (e.g., an image point) and have a corresponding width (e.g., the pupil width). In some examples, light 510-b and 510-c may each be an example of light from multiple pixels.

Inventive aspects of the present disclosure are illustrated by the non-limiting examples of FIG. 5B. For example, a waveguide may have a first waveguide surface and a second waveguide surface parallel to the first waveguide surface. A partially reflective element (e.g., light homogenizing element 505-b) may be located between the first waveguide surface and the second waveguide surface. The partially reflective element may have a reflective axis parallel to a waveguide surface normal.

Additionally or alternatively, the waveguide may comprise a first layer (e.g., first substrate 540-b) having parallel plane surfaces and a second layer (e.g., waveguide medium 535-b) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. In these cases, the partially reflective element may be a boundary condition associated with the first layer and the second layer.

Additional examples and various implementations are contemplated using the light homogenizing techniques described herein.

Figure 5C:
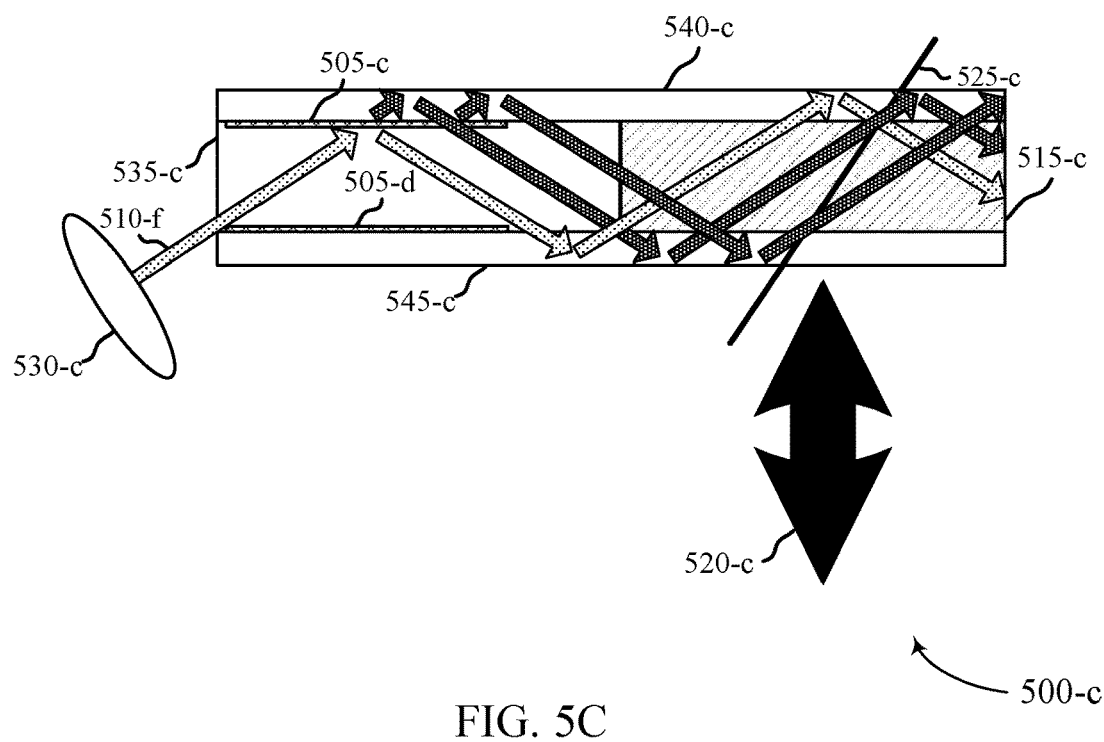

FIG. 5C illustrates a diagram of an optical system 500-c incorporating light homogenization. Optical system 500-c may be utilized in an application such as, but not limited to, a head mounted display. The optical system 500-c may employ selective coupling to allow a partially reflective element of light homogenizing element 505-c to reflect light 510-f towards a specific location. The represented angles are internal angles relative to the surface normal of the grating medium 515-c, and that refraction at the grating medium 515-c and/or the substrate interface, as well as at the substrate air interface, is ignored for the purpose of illustration. Replicated pupil 520-c may project an image corresponding to reflective axis 525-c. Grating medium 515-c may include a grating structure. The grating structure may have a plurality of holograms or sinusoidal volume gratings.

Optical system 500-c illustrates a light source 530-c where light 510-f enters the waveguide medium 535-c. In order for reflected light 510-f to be reflected and project replicated pupil 520-c, light 510-f may propagate through the waveguide medium 535-c by total internal reflection. For example, light 510-f may propagate through waveguide medium 535-c and reflect between a downward mode direction and an upward mode direction. Light 510-f may be an example of light from one pixel (e.g., an image point) and have a corresponding width (e.g., the pupil width). In some examples, light 510-c may be an example of light from multiple pixels.

Optical system 500-c may include a grating medium 515-c located at least partially within a waveguide medium 535-c. Grating medium 515-c may be implemented in a light coupling device (e.g., an input coupler, a cross coupler, or an output coupler) located within waveguide medium 535-c. In some implementations, a light homogenizing element 505-c may be located at the bottom interface of first substrate 540-c and light homogenizing element 505-d may be located at the top interface of second substrate 545-c. In some cases, light homogenizing elements 505-c and 505-d may include a partially reflective element (e.g., with 50% reflectivity). For example, multiple partially reflective elements of light homogenizing element 505-c and 505-d may be located in parallel at the bottom interface of first substrate 540-c and the top interface of second substrate 545-c, respectively.

Inventive aspects of the present disclosure are illustrated by the non-limiting examples of FIG. 5C. For example, a waveguide may have a first waveguide surface and a second waveguide surface parallel to the first waveguide surface. A partially reflective element (e.g., one or both of light homogenizing element 505-c and light homogenizing element 505-d) may be located between the first waveguide surface and the second waveguide surface. The partially reflective element may have a reflective axis parallel to a waveguide surface normal.

Additionally or alternatively, the waveguide may comprise a first layer (e.g., first substrate 540-c) having parallel plane surfaces and a second layer (e.g., waveguide medium 535-c) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-c) disposed on one or both of the interior plane surface of the parallel plane surfaces of the first layer or the interior plane surface of the parallel plane surfaces of the second layer.

Additionally or alternatively, the waveguide may comprise a first layer (e.g., second substrate 545-c) having parallel plane surfaces and a second layer (e.g., waveguide medium 535-c) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-d) disposed on one or both of the interior plane surface of the parallel plane surfaces of the first layer or the interior plane surface of the parallel plane surfaces of the second layer. The partially reflective coating may comprise a metallic or dielectric material.

Additional examples and various implementations are contemplated using the light homogenizing techniques described herein.

Figure 5D:
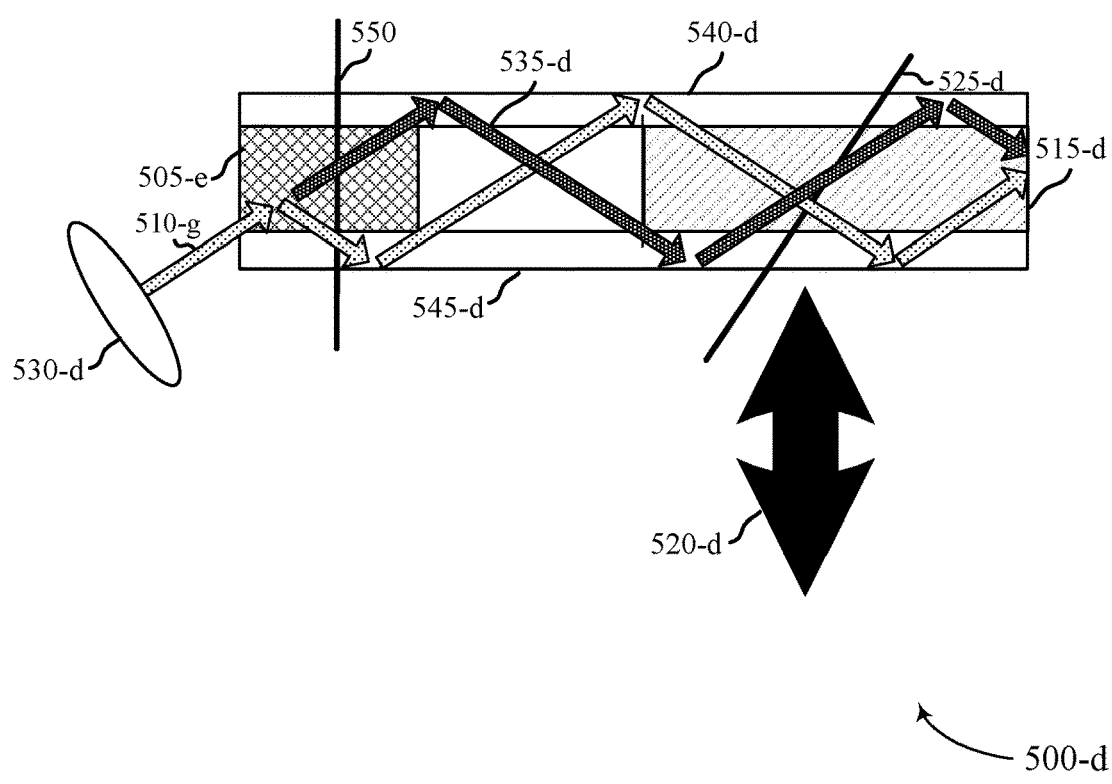

FIG. 5D illustrates a diagram of an optical system 500-d incorporating light homogenization. Optical system 500-d may be utilized in an application such as, but not limited to, a head mounted display. The optical system 500-d may employ selective coupling to allow a partially reflective element of light homogenizing element 505-e to reflect light towards a specific location Refraction at the grating medium the substrate interface, as well as at the substrate air interface, is ignored for the purpose of illustration in FIG. 5D.

Replicated pupil 520-d may project an image corresponding to reflective axis 525-d. Grating medium 515-d may include a grating structure. The grating structure may have a plurality of holograms or sinusoidal volume gratings.

Optical system 500-d illustrates a light source 530-d where light 510-g enters the waveguide medium 535-d. In order for light 510-g to be reflected and project replicated pupil 520-d, light 510-g may propagate through the waveguide medium 535-d by total internal reflection. For example, light 510-g may propagate through waveguide medium 535-c and reflect between a downward mode direction and an upward mode direction. Light 510-g may be an example of light from one pixel (e.g., an image point) and have a corresponding width (e.g., the pupil width). In some examples, light 510-g may be an example of light from multiple pixels.

Optical system 500-d may include a grating medium 515-d located at least partially within a waveguide medium 535-d. Grating medium 515-d may be implemented in a light coupling device (e.g., an input coupler, a cross coupler, or an output coupler) located within waveguide medium 535-d. In some cases, light homogenizing element 505-e may comprise a skew mirror with a light homogenizing reflective axis 550 parallel to the surface of waveguide medium 535-d. In some cases, the skew mirror may be selectively reflective based at least in part on an angle of incidence associated with light 510-g incident on or propagating through the skew mirror. Light 510-g including a first set of ray angles (e.g., 65°-77° absolute angle with respect to surface normal) may have a higher reflectivity (e.g., 50% reflectivity), whereas light 510-g including a second set of ray angles (e.g., 49°-57° absolute angle with respect to surface normal) may have lower reflectivity (e.g., 25% reflectivity). For example, holograms configured to reflect light having angles of incidence within a first range (e.g., 65°-77° absolute angle with respect to surface normal) may be recorded stronger. In some cases, the skew mirror may be configured to selectively reflect light 510-g incident on or propagating through the skew mirror in two dimensions.

Light homogenizing element 505-e may further include a grating medium and more than one grating structures within the grating medium. The grating structures may include a plurality of holograms or sinusoidal volume gratings. The grating structures may reflect light 510-g with a first wavelength about a reflective axis offset from a surface normal of the grating structure at a first set of incident angles and may reflect light 510-g with a second wavelength about a reflective axis offset from a surface normal of the grating structure at a second set of incident angles. Each grating structure may include a different reflective axis offset from the normal of the corresponding grating structure.

Inventive aspects of the present disclosure are illustrated by the non-limiting examples of FIG. 5D. For example, a waveguide may have a first waveguide surface and a second waveguide surface parallel to the first waveguide surface. A partially reflective element (e.g., light homogenizing element 505-e) may be located between the first waveguide surface and the second waveguide surface. The partially reflective element may have a reflective axis parallel to a waveguide surface normal.

Additionally or alternatively, the waveguide may comprise a first layer (e.g., first substrate 540-d) having parallel plane surfaces and a second layer (e.g., waveguide medium 535-d) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, a light coupling device may be disposed within at least one of the first layer or the second layer of the waveguide. The light coupling device may comprise a grating medium (e.g., grating medium 515-d), a first grating structure within the grating medium, and a second grating structure within the grating medium. The first grating structure may be configured to reflect light of a wavelength about a first reflective axis (e.g., reflective axis 525-d) offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

Additionally or alternatively, the partially reflective element may comprise a grating medium (e.g., light homogenizing element 505-e), a first grating structure within the grating medium, and a second grating structure within the grating medium. The first grating structure may be configured to reflect light of a wavelength about a first reflective axis (e.g., light homogenizing reflective axis 550) parallel to the waveguide surface normal at a first incidence angle. The second grating structure may be configured to reflect light of the wavelength about a second reflective axis parallel to the waveguide surface normal at a second incidence angle different from the first incidence angle.

In some cases, at least one of the first grating structure or the second grating structure of the partially reflective element comprises a hologram (e.g., a volume-phase hologram). In some cases, at least one of the first grating structure or the second grating structure of the partially reflective element comprises a non-holographic diffractive optical element. The non-holographic diffractive optical element may include louvered mirrors or liquid crystal gratings, for example.

In some cases, the grating medium of the partially reflective element is configured to reflect between 10% and 90% of the light of the wavelength incident on the grating medium. In some cases, the each of the first incidence angle and the second incidence angle has a value between 65° and 77° with respect to the waveguide surface normal. In some cases, the grating medium of the partially reflective element is configured to allow a majority of light of the wavelength to pass through the grating medium at third incidence angle different from the first incidence angle and the second incidence angle. That is, a greater percentage of the light incident on the grating medium at third incidence angle may pass through the grating medium than the light incident on the grating medium at either the first incidence angle or second incidence angle. In some cases, the third incidence angle may be closer to a critical angle of the waveguide (e.g., approximately 41° in some implementations) than either of the first incidence angle or the second incidence angle. For example, the third incidence angle may have a value between 49° and 57° with respect to the waveguide surface normal.

Additional examples and various implementations are contemplated using the light homogenizing techniques described herein.

Figure 5E:
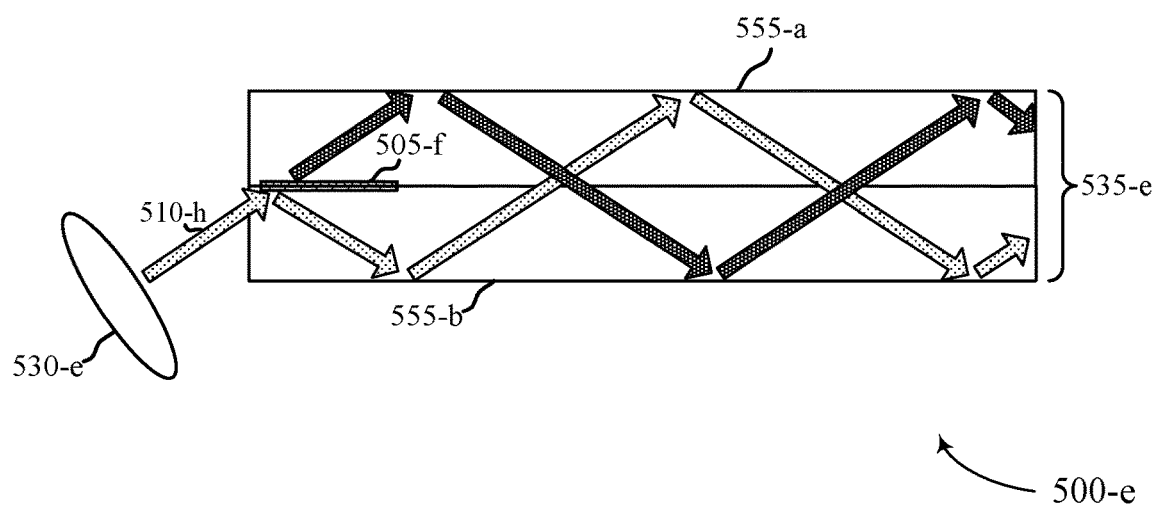

FIG. 5E illustrates a diagram of an optical system 500-e incorporating light homogenization. Optical system 500-e may be utilized in an application such as, but not limited to, a head mounted display. The optical system 500-e may employ selective coupling to allow a partially reflective element of light homogenizing element 505-f to reflect light towards a specific location. Optical system 500-e illustrates a light source 530-e where light 510-h enters the waveguide 535-e. For example, light 510-h may propagate through waveguide 535-e and reflect between a downward mode direction and an upward mode direction. Light 510-h may be an example of light from one pixel (e.g., an image point) and have a corresponding width (e.g., the pupil width). In some examples, light 510-h may be an example of light from multiple pixels.

In some examples, light homogenizing element 505-f may include a partially reflective element (e.g., with 50% reflectivity) in a waveguide 535-e without a recording medium layer. Waveguide 535-e may be formed by cementing two glass slabs of half the total thickness of the waveguide 535-e such that a partially reflective element is disposed between the two abutting surfaces top slab 555-a and bottom slab 555-b. In some cases, a partially reflective element may be a partially reflective coating applied to a surface of at least one of the two slabs. In some examples, light homogenizing element 505-f may be utilized with or disposed within a waveguide system that includes one or more coupler comprised of volume holograms. In other examples, light homogenizing element **505-*f*** may be utilized with or disposed within a waveguide system that includes one or more coupler comprised of diffractive optical elements (DOEs), louvered mirrors, and/or liquid crystal gratings.

Inventive aspects of the present disclosure are illustrated by the non-limiting examples of FIG. 5E. For example, a waveguide may have a first waveguide surface and a second waveguide surface parallel to the first waveguide surface. A partially reflective element (e.g., light homogenizing element **505-*f***) may be located between the first waveguide surface and the second waveguide surface. The partially reflective element may have a reflective axis parallel to a waveguide surface normal.

Additionally or alternatively, the waveguide may comprise a first layer (e.g., first slab **555-*a*) having parallel plane surfaces and a second layer (e.g., second slab 555-*b*) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer and the second layer have matched indices of refraction. In these cases, the partially reflective element may be a partially reflective coating (e.g., light homogenizing element 505-*f***) disposed on one or both of the interior plane surface of the parallel plane surfaces of the first layer or the interior plane surface of the parallel plane surfaces of the second layer.

Additional examples and various implementations are contemplated using the light homogenizing techniques described herein.

Figure 6A:
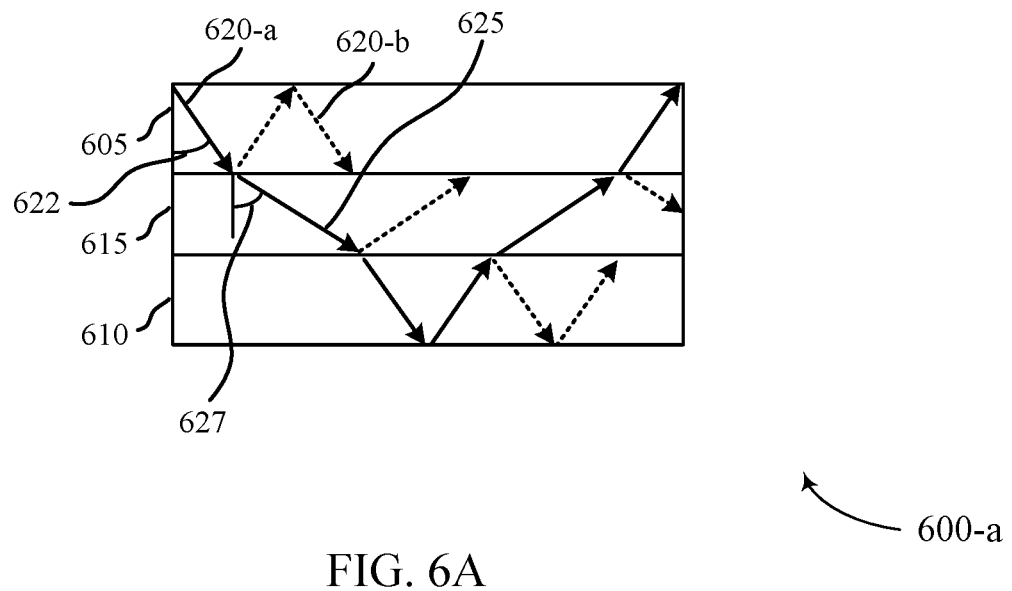
FIG. 6A illustrates an example of a system that supports light homogenization in accordance with aspects of the present disclosure.

FIG. 6A illustrates an example system **600-*a* that supports light homogenization in accordance with various aspects of the present disclosure. System 600-*a* may include a first substrate 605, second substrate 610, and waveguide medium 615. Light 620-*a* may enter the first substrate 605 at an angle of incidence 622 with respect to the surface normal. Light 620-*b* may reflect off the bottom surface of the first substrate 605. Refracted light 625 may enter waveguide medium 615 at an angle of refraction 627** with respect to the surface normal.

In some examples, an index of refraction mismatch may be purposefully applied to a waveguide 615 for the purpose of homogenizing light. In some cases, an index of refraction mismatch may be configured between the first substrate 605 and the waveguide medium 615 and/or the second substrate 610 and the waveguide medium 615. For example, first substrate 605 and second substrate 610 may have an index of refraction of 1.83 and waveguide medium 615 may have an index of refraction of 1.53. Light at an angle of incidence of 54.5° with respect to surface normal incident on a boundary of the first substrate 605 and the waveguide medium 615 results in refracted light at the second angle of incidence of 77° a reflectivity of 0.26 associated with a reflected wave. A resulting replicated pupil period is 6.6 mm when the waveguide medium 615, top substrate 605, bottom substrate 610 are each 0.5 mm thick. By contrast, when the top substrate 605 and the bottom substrate 610 have an index of refraction of 1.53, light remains at an angle of 77° and the pupil replication period becomes 13.0 mm.

In some cases, increasing the index of refraction for first substrate 605 and second substrate 610 may cause a decrease in a pupil replication period. For example, TIR geometry and characteristics of optical elements in a waveguide may be configured to homogenize light. In other cases, increasing the index of refraction for first substrate 605 and second substrate 610 may not affect a pupil size of the waveguide. For example, a decrease in the pupil replication period with a same pupil size improves homogenization of the propagating light, particularly for light having angles of incidence close to the critical angle.

In some cases, system **600-*a* may include a grating medium (not shown) located at least partially within a waveguide medium 615. A grating medium may be implemented in a light coupling device (e.g., an input coupler, a cross coupler, or an output coupler) located within waveguide medium 615. In some examples, an index of refraction mismatch may be imposed on a portion of the first substrate 605 or second substrate 610 of waveguide medium 615. That is, the first substrate 605 and waveguide medium 615 may have matched indices of refraction, and the second substrate 610 and waveguide medium 615 may have different indices of refraction. For example, the index of refraction mismatch between the second substrate 610 and the waveguide medium 615 may cause a Fresnel reflection off the top surface of the second substrate 610**. In some cases, TIR pupil geometry may improve homogenization by decreasing the pupil replication period and leaving the pupil size unchanged. In other examples, an index of reflection mismatch may produce reflections during hologram recording that impacts the recording of holograms.

Inventive aspects of the present disclosure are illustrated by the non-limiting examples of FIG. 6A. For example, a waveguide may have a first waveguide surface and a second waveguide surface parallel to the first waveguide surface. The waveguide may comprise a first layer (e.g., first substrate 605) having parallel plane surfaces and a second layer (e.g., waveguide medium 615) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. For example, the first layer may have an index of refraction higher than the second layer. In these cases, the partially reflective element may be a boundary condition associated with the first layer and the second layer. The partially reflective element may have a reflective axis parallel to a waveguide surface normal.

Additionally or alternatively, a waveguide may have a first waveguide surface and a second waveguide surface parallel to the first waveguide surface. The waveguide may comprise a first layer (e.g., bottom substrate 610) having parallel plane surfaces and a second layer (e.g., waveguide medium 615) having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer. In some cases, the first layer has an index of refraction different from the second layer. For example, the first layer may have an index of refraction higher than the second layer. In these cases, the partially reflective element may be a boundary condition associated with the first layer and the second layer. The partially reflective element may have a reflective axis parallel to a waveguide surface normal.

Additional examples and various implementations are contemplated using the light homogenizing techniques described herein.

Figure 6B:
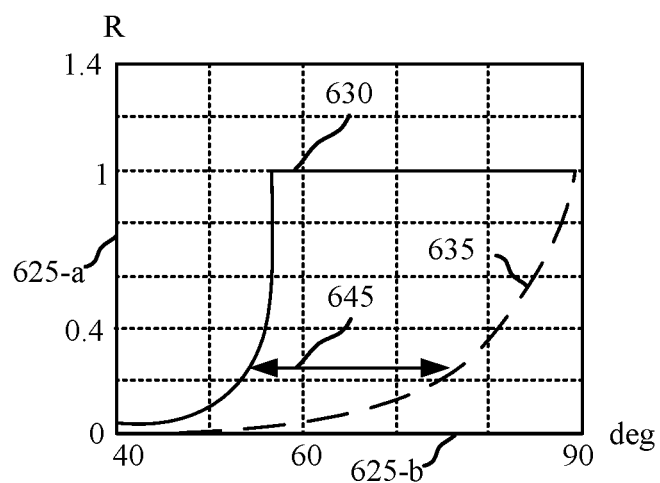
FIG. 6B illustrates an example of a plot that supports light homogenization in accordance with aspects of the present disclosure.

FIG. 6B illustrates an example plot 600-b that supports light homogenization in accordance with various aspects of the present disclosure. Plot 600-b includes axis 625-a that may represent reflectivity and axis 625-b that may represent incidence angles. Plot 600-b may also include first plot line 630, second plot line 635, and difference segment 645.

First plot line 630 may represent the reflectivity a transverse electric (TE) polarized incident light wave over a range of incidence angles for a matched boundary condition (i.e., equal indices of refraction). In some examples, first plot line 630 may represent the reflectivity a transverse electric (TE) polarized incident light wave over a range of incidence angles for light traveling from the top substrate to the waveguide medium (i.e., from a medium with a higher index of refraction to a medium with a lower index of refraction).

In some examples, second plot line 635 may represents the reflectivity a TE polarized incident light wave over a range of incidence angles for a mismatched boundary condition (i.e., indices of refraction differ on opposite sides of the boundary). In other examples, second plot line 635 may represent the reflectivity a transverse electric (TE) polarized incident light wave over a range of incidence angles for light traveling from the waveguide medium to the second substrate 610 (i.e., from a medium with a lower index of refraction to a medium with a higher index of refraction).

Difference segment 645 may illustrate the difference associated with light at an incidence angle of 54.5° in $n_s$ and light at an incidence angle of 77° in $n_m$ (e.g., where $n_m$=1.53 and $n_s$=1.83). The reflectivity of the boundary in both directions is 0.26. The second plot line 635 may show reflectivity for a boundary condition associated with an index of refraction difference of 0.3. Light at an incidence angle of 77° may result in a reflectivity of 0.26. Thus, Fresnel reflections may be highest for light having large angles of incidence with respect to surface normal of the waveguide (e.g., propagating light having angles of incidence close to 90°). Fresnel reflections caused by light having angles of incidence close to the critical angle will have little to no effect on improving homogenization of light in the waveguide.

Figure 7A:
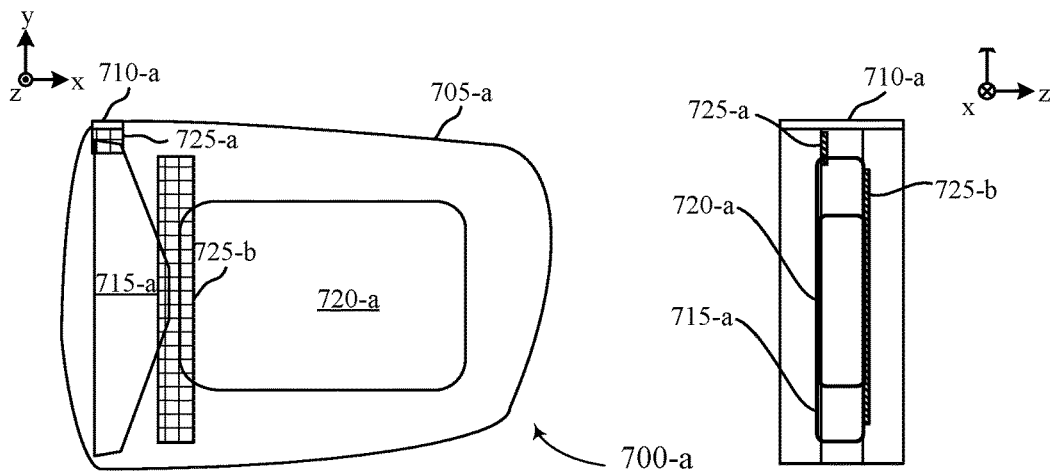
FIGS. 7A-7C illustrates an example of an optical lens that supports light homogenization in accordance with aspects of the present disclosure.

FIG. 7A illustrates an example of an optical lens 700-a that supports light homogenization in accordance with various aspects of the present disclosure. The optical lens 700-a may include waveguide 705-a, light input section 710-a, first light coupling device 715-a (e.g., cross coupler), second light coupling device 720-a (e.g., output coupler), and light homogenizing elements 725-a and 725-b. Waveguide 705-a may also include another light coupling device (e.g., an input coupler); however, the input coupler is ignored for the purpose of illustration). Waveguide 705-a may include a first and second surface parallel to each other and a light receiving end proximal to the light input section 710-a and a light output end distal to the light input section 710-a.

In some examples, light homogenizing element 725-a may be located between light input section 710-a and first light coupling device 715-a. In other examples, light homogenizing element 720-b may be located between first light coupling device 715-a and second light coupling device 720-a. In some cases, light homogenizing element 725-a may be located between the input coupler (not shown) and first light coupling device 715-a. Light homogenizing elements 725-a or 725-b may be located throughout the entire waveguide 705-a. However, if light homogenizing elements 725-a and 725-b may be located throughout the entire waveguide 705-a, there may be issues with recording first light coupling device 715-a and second light coupling device 720-a. In some cases, light homogenizing elements 725-a and 725-b may or may not spatially overlap the first light coupling device 715-a and the second light coupling device 720-a. In some examples, light homogenizing element 725-a may or may not spatially overlap light input section 710-a.

In some cases, light homogenizing element 725-a may be configured to reflect and refract light in a first direction (e.g., light propagating in the y-axis direction) and light homogenizing element 725-b may be configured to reflect and refract light in a second direction (e.g., light propagating in the x-axis direction). In other examples, light homogenizing elements 725-a and 725-b may be two-dimensional such that the homogenizing element is configured to direct light in both a first direction (e.g., light propagating in the x-axis direction) and a second direction (e.g., light propagating in the y-axis direction or the z-axis direction).

Inventive aspects of the present disclosure are illustrated by the non-limiting examples of FIG. 7A. For example, a waveguide may have a first waveguide surface and a second waveguide surface parallel to the first waveguide surface. A partially reflective element (e.g., one of both of light homogenizing element 725-a and light homogenizing element 725-b) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, the partially reflective element may be a partially reflective coating disposed on one or both of the interior plane surface of the parallel plane surfaces of the first layer or the interior plane surface of the parallel plane surfaces of the second layer.

In some examples, a light coupling device (e.g., one or both of light coupling device 715-a and light coupling device 720-a) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

Additional examples and various implementations are contemplated using the light homogenizing techniques described herein.

Figure 7B:
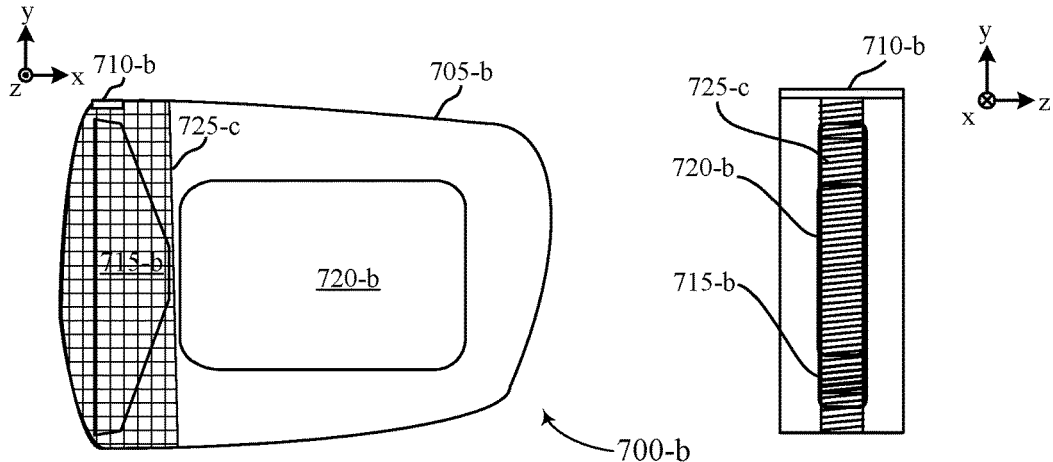

FIG. 7B illustrates an example of an optical lens **700-*b* that supports light homogenization in accordance with various aspects of the present disclosure. The optical lens 700-*b* may include waveguide 705-*b*, light input section 710-*b*, first light coupling device 715-*b* (e.g., cross coupler), second light coupling device 720-*b* (e.g., output coupler), and light homogenizing element 725-*c*. Pupil expander may also include another light coupling device (e.g., an input coupler); however, the input coupler is ignored for the purpose of illustration). Waveguide 705-*b* may include a first and second surface parallel to each other and a light receiving end proximal to the light input section 710-*b* and a light output end distal to the light input section 710-*b*. In some cases, light homogenizing element 725-*c* may spatially overlap the first light coupling device 715-*b*. In some examples, light homogenizing element 725-*c* may or may not spatially overlap light input section 710-*b***.

Inventive aspects of the present disclosure are illustrated by the non-limiting examples of FIG. 7B. For example, a waveguide may have a first waveguide surface and a second waveguide surface parallel to the first waveguide surface. A partially reflective element (e.g., light homogenizing element **725-*c***) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

Additionally or alternatively, the partially reflective element may comprise a grating medium (e.g., light homogenizing element **725-*c***), a first grating structure within the grating medium, and a second grating structure within the grating medium. The first grating structure may be configured to reflect light of a wavelength about a first reflective axis parallel to the waveguide surface normal at a first incidence angle. The second grating structure may be configured to reflect light of the wavelength about a second reflective axis parallel to the waveguide surface normal at a second incidence angle different from the first incidence angle.

In some cases, at least one of the first grating structure or the second grating structure of the partially reflective element comprises a hologram (e.g., a volume-phase hologram). In some cases, at least one of the first grating structure or the second grating structure of the partially reflective element comprises a non-holographic diffractive optical element.

In some examples, a light coupling device (e.g., one or both of light coupling device **715-*b* and light coupling device 720-*b***) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

In some cases, the partially reflective element spatially overlaps the grating medium. For example, at least one hologram of multiple holograms in a grating structure of the partially reflective element (e.g., light homogenizing element **725-*c*) may at least partially spatially overlap at least one hologram of multiple holograms in a grating structure of the light coupling device (e.g., light coupling device 715-*b***). For example, spatially overlapping holograms overlap with respect to the space occupied or volume shared by two holograms in a contiguous grating medium (e.g., two spatially overlapping holograms share or coexist in at least a portion of the same space or volume within the grating medium or mediums). In this manner, at least some of the varying refractive index properties and associated fringe patterns of a first hologram will occupy the same space or volume of (and be superimposed or intermingled with) at least some of the varying refractive index properties and associated fringe patterns of a second hologram within the grating medium or mediums.

Additional examples and various implementations are contemplated using the light homogenizing techniques described herein.

Figure 7C:
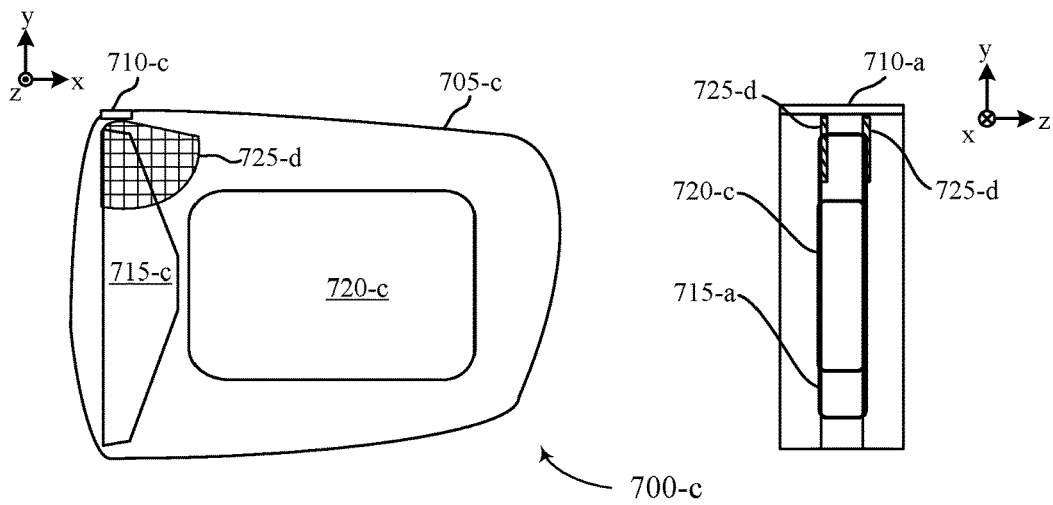

FIG. 7C illustrates an example of an optical lens **700-*c* that supports light homogenization in accordance with various aspects of the present disclosure. The optical lens 700-*c* may include waveguide 705-*c*, light input section 710-*c*, first light coupling device 715-*c* (e.g., cross coupler), second light coupling device 720-*c* (e.g., output coupler), and light homogenizing element 725-*d*. Pupil expander may also include another light coupling device (e.g., an input coupler); however, the input coupler is ignored for the purpose of illustration). Waveguide 705-*c* may include a first and second surface parallel to each other and a light receiving end proximal to the light input section 710-*c* and a light output end distal to the light input section 710-*c*. In some cases, light homogenizing element 725-*d* may include a radial composition and spatially overlap a portion of first light coupling device 715-*c*. In some examples, light homogenizing element 725-*d* may or may not spatially overlap light input section 710-*c***.

Inventive aspects of the present disclosure are illustrated by the non-limiting examples of FIG. 7C. For example, a waveguide may have a first waveguide surface and a second waveguide surface parallel to the first waveguide surface. A partially reflective element (e.g., light homogenizing element 725-*d*) may be located between the first waveguide surface and the second waveguide surface. The partially reflective element may have a reflective axis parallel to a waveguide surface normal.

Additionally or alternatively, the waveguide may comprise a first layer having parallel plane surfaces and a second layer having parallel plane surfaces. An interior plane surface of the parallel plane surfaces of the first layer may abut an interior plane surface of the parallel plane surfaces of the second layer waveguide. In some examples, the first waveguide surface may be a plane surface of the first layer opposite the interior plane surface of the parallel plane surfaces of the first layer, and the second waveguide surface may be a plane surface of the second layer opposite the interior plane surface of the parallel plane surfaces of the second layer.

In some examples, the partially reflective element may be a partially reflective coating disposed on one or both of the interior plane surface of the parallel plane surfaces of the first layer or the interior plane surface of the parallel plane surfaces of the second layer.

In some examples, a light coupling device (e.g., one or both of light coupling device 715-*c* and light coupling device 720-*c*) may be disposed within at least one of the first layer or the second layer of the waveguide. The light coupling device may comprise a grating medium, a first grating structure within the grating medium, and a second grating structure within the grating medium. The first grating structure may be configured to reflect light of a wavelength about a first reflective axis offset from the waveguide surface normal at a first incidence angle. The second grating structure may be configured to reflect light of the wavelength about a second reflective axis offset from the waveguide surface normal at a second incidence angle different from the first incidence angle. In some cases, the first reflective axis and second reflective axis are substantially parallel.

In some cases, at least one of the first grating structure or the second grating structure comprises a hologram (e.g., a volume-phase hologram). In some cases, at least one of the first grating structure or the second grating structure comprises a non-holographic diffractive optical element. The non-holographic diffractive optical element may include louvered mirrors or liquid crystal gratings, for example.

In some cases, the partially reflective element may at least partially overlap the grating medium of the light coupling device (e.g., light coupling device 715-*c*) in a direction orthogonal to a plane of the first waveguide surface.

Additional examples and various implementations are contemplated using the light homogenizing techniques described herein.

Figure 8:
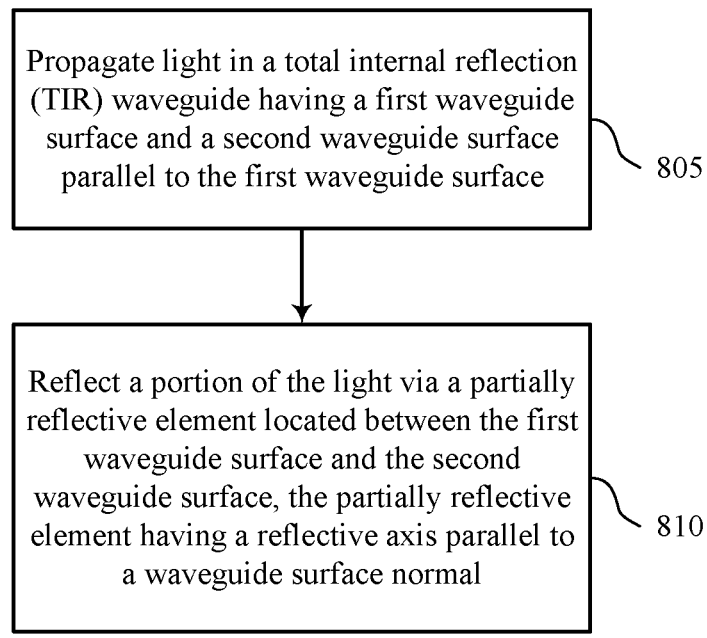
FIG. 8 illustrate a method for light homogenization in accordance with aspects of the present disclosure.

FIG. 8 shows a flowchart illustrating a method 800 for light homogenization in accordance with aspects of the present disclosure. The operations of method 800 may be implemented by a waveguide or its components as described herein. For example, the operations of method 800 may be performed by a waveguide as described with reference to FIGS. 4 through 7.

At block 805 the waveguide may propagate light in a TIR waveguide having a first waveguide surface and a second waveguide surface parallel to the first waveguide surface. The operations of block 805 may be performed according to the methods described herein. In certain examples, aspects of the operations of block 805 may be performed by a waveguide as described with reference to FIGS. 4 through 7.

At block 810 the waveguide may reflect a portion of the light via a partially reflective element located between the first waveguide surface and the second waveguide surface, the partially reflective element having a reflective axis parallel to a waveguide surface normal. The operations of block 810 may be performed according to the methods described herein. In certain examples, aspects of the operations of block 810 may be performed by a partially reflective element as described with reference to FIGS. 4 through 7.

It should be noted that these methods and processes describe possible implementations, and that the operations and the steps may be rearranged or otherwise modified such that other implementations are possible. In some examples, aspects from two or more of the methods or processes described herein may be combined. For example, aspects of each of the methods and processes may include steps or aspects of the other methods, or other steps or techniques described herein.

The description herein is provided to enable a person skilled in the art to make or use the disclosure. Various modifications of the subject technology will be readily apparent to those skilled in the art given the benefit of the present disclosure, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Terminology

The term "approximately," refers to plus or minus 10% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single conjugate vector pair in k-space (or a substantially point-like conjugate pair distribution in k-space).

The term "eye box" refers to a two-dimensional area outlining a region wherein a human pupil may be placed for viewing the full field of view at a fixed distance from a grating structure.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. An optical system, comprising:
a waveguide having a first waveguide substrate and a second waveguide substrate;
an input coupler configured to couple light into the waveguide;
a grating medium interposed between the first and second waveguide substrates;
holographic grating structures in the grating medium and configured to diffract the light coupled into the waveguide by the input coupler; and
a partially reflective element located between the first and second waveguide substrates, wherein the partially reflective element is configured to, prior to the light being diffracted by the holographic grating structures, transmit a first portion of the light while reflecting a second portion of the light.

2. The optical system of claim 1, wherein the partially reflective element has a lateral surface that extends parallel to a lateral surface of the first waveguide substrate.

3. The optical system of claim 1, wherein the partially reflective element is configured to homogenize the light.

4. The optical system of claim 1, wherein the partially reflective element has a lateral area and a reflectivity that varies across the lateral area.

5. The optical system of claim 1, wherein the partially reflective element comprises a coating embedded in the waveguide.

6. The optical system of claim 5, wherein the coating comprises a metallic coating.

7. The optical system of claim 5, wherein the coating comprises a dielectric coating.

8. The optical system of claim 1, further comprising an additional partially reflective element that at least partially overlaps the partially reflective element.

9. The optical system of claim 1, wherein the holographic grating structures comprise an output coupler configured to couple the light out of the waveguide.

10. The optical system defined in claim 1, wherein the partially reflective element comprises a plurality of holograms in a medium having a lateral surface extending parallel to a lateral surface of the first waveguide substrate.

11. The optical system defined in claim 10, wherein the medium comprises the grating medium and wherein the plurality of holograms comprise a plurality of volume holograms in the grating medium.

12. An optical system comprising:
a waveguide having a first waveguide substrate and a second waveguide substrate;
an input coupler configured to couple light into the waveguide;
a first partially reflective element located between the first and second waveguide substrates; and
a second partially reflective element located between the first and second waveguide substrates, wherein the first partially reflective element extends parallel to and at least partially overlaps the second partially reflective element.

13. The optical system defined in claim 12, wherein the first and second partially reflective elements are configured to homogenize the light coupled into the waveguide by the input coupler.

14. The optical system defined in claim 13 further comprising an output coupler on the waveguide, wherein the output coupler is configured to couple the light out of the waveguide.

15. The optical system defined in claim 14, wherein the output coupler comprises diffractive grating structures formed in a grating medium interposed between the first and second waveguide substrates.

16. The optical system defined in claim 12, wherein the first partially reflective element extends parallel to a lateral surface of the first waveguide substrate.

17. The optical system defined in claim 16, wherein the first and second partially reflective elements are configured to homogenize the light coupled into the waveguide by the input coupler.

18. An optical system comprising:

a waveguide having a first waveguide substrate with a first refractive index and second waveguide substrate with a second refractive index;

a medium between the first and second waveguide substrates and having a third refractive index that is different from the first and second refractive indices;

an output coupler configured to couple light propagating along the waveguide out of the waveguide; and a partially reflective element configured to convey the light towards the output coupler, the partially reflective element comprising:

a first interface between the medium and the first waveguide substrate, wherein the first interface is configured to transmit at least some of the light and to reflect at least some of the light; and a second interface between the medium and the second waveguide substrate, wherein the second interface is configured to transmit at least some of the light and to reflect at least some of the light.

19. The optical system defined in claim 18, wherein the output coupler comprises holographic grating structures configured to diffract the light out of the waveguide.

20. The optical system defined in claim 19, wherein the partially reflective element is configured to homogenize the light and wherein the holographic grating structures are recorded in the medium.

* * * * *